April 16, 1963  J. L. FERGUSON, JR., ET AL  3,085,376
CASE SEALING APPARATUS
Filed Feb. 23, 1960  20 Sheets-Sheet 1
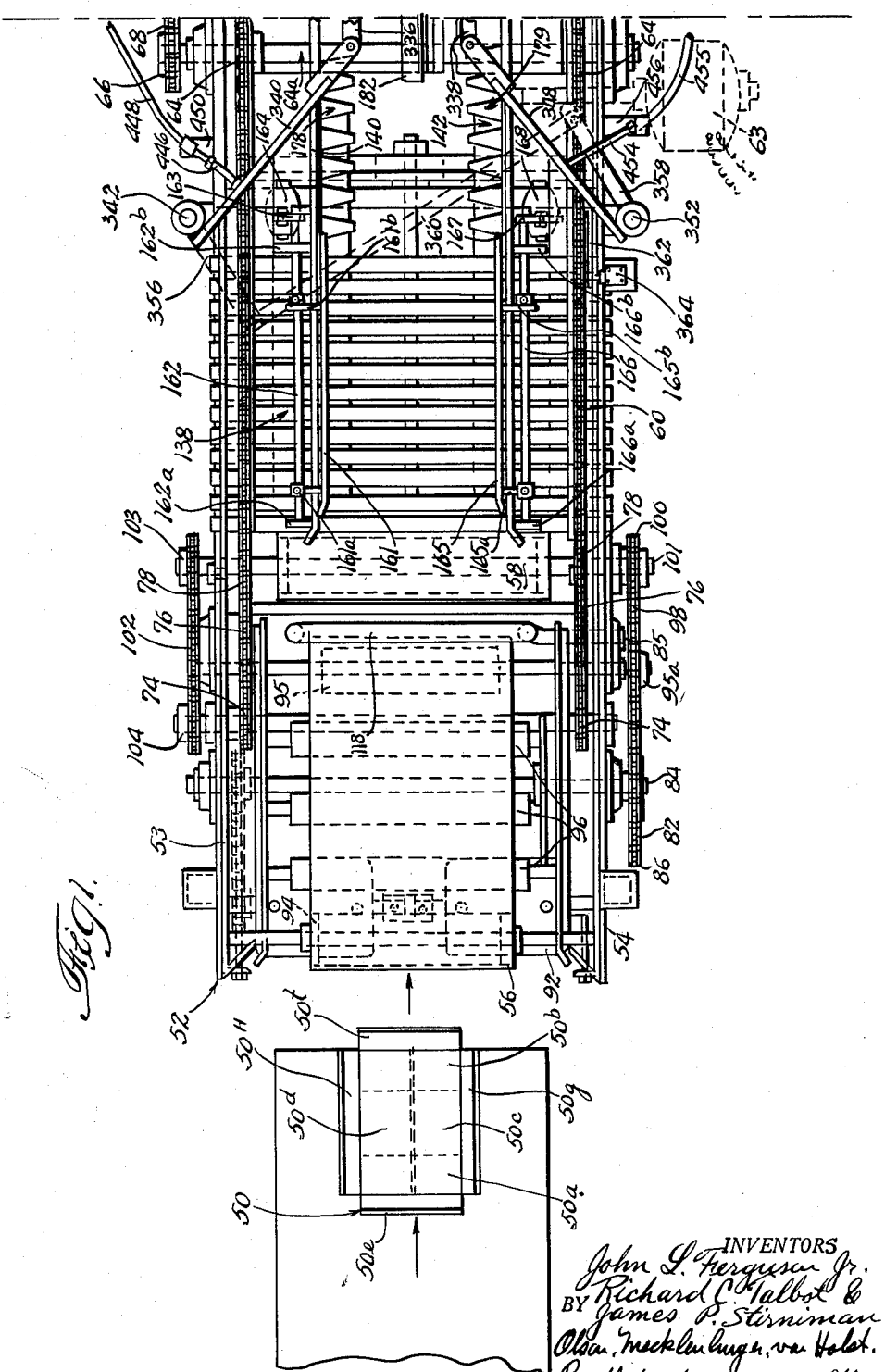

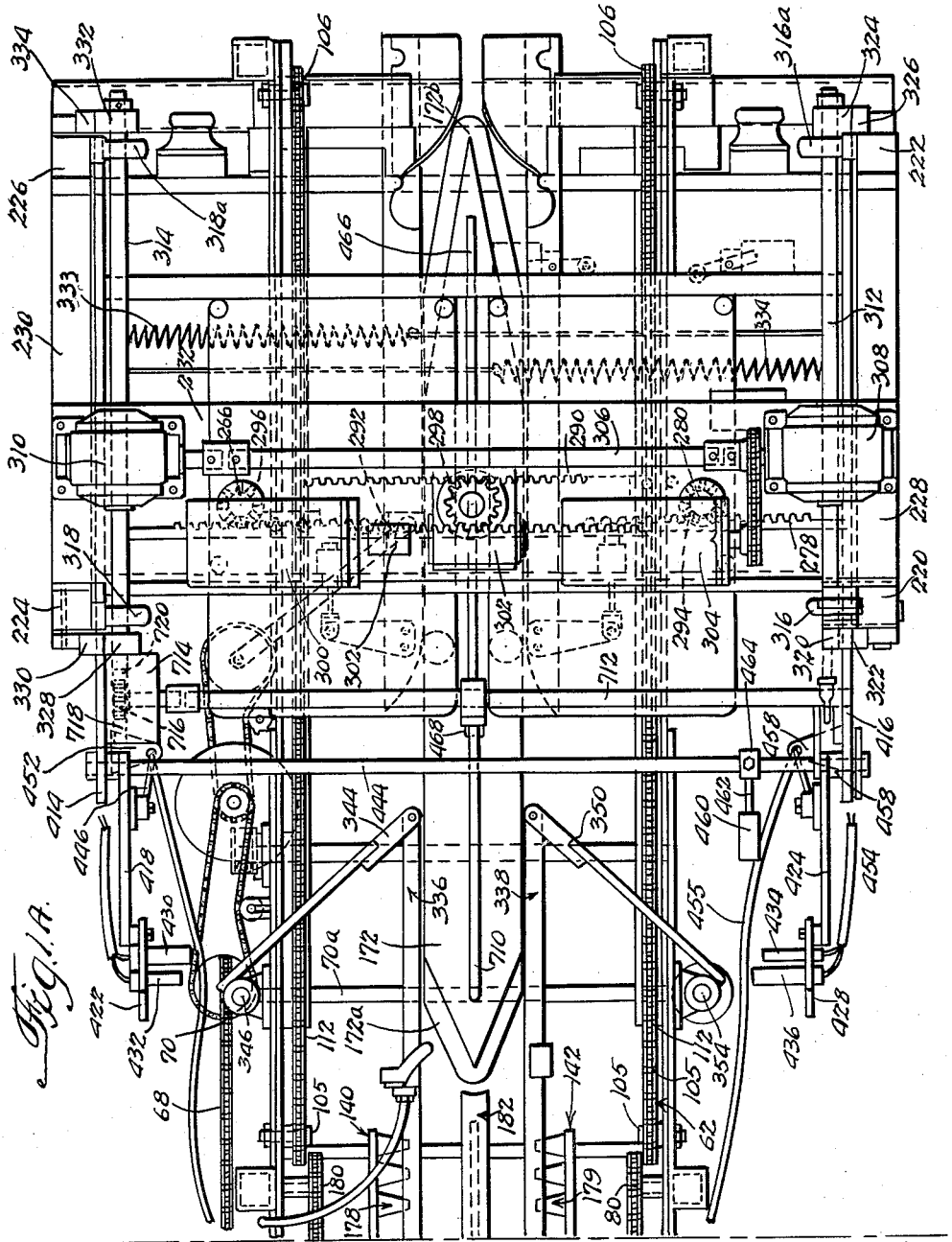

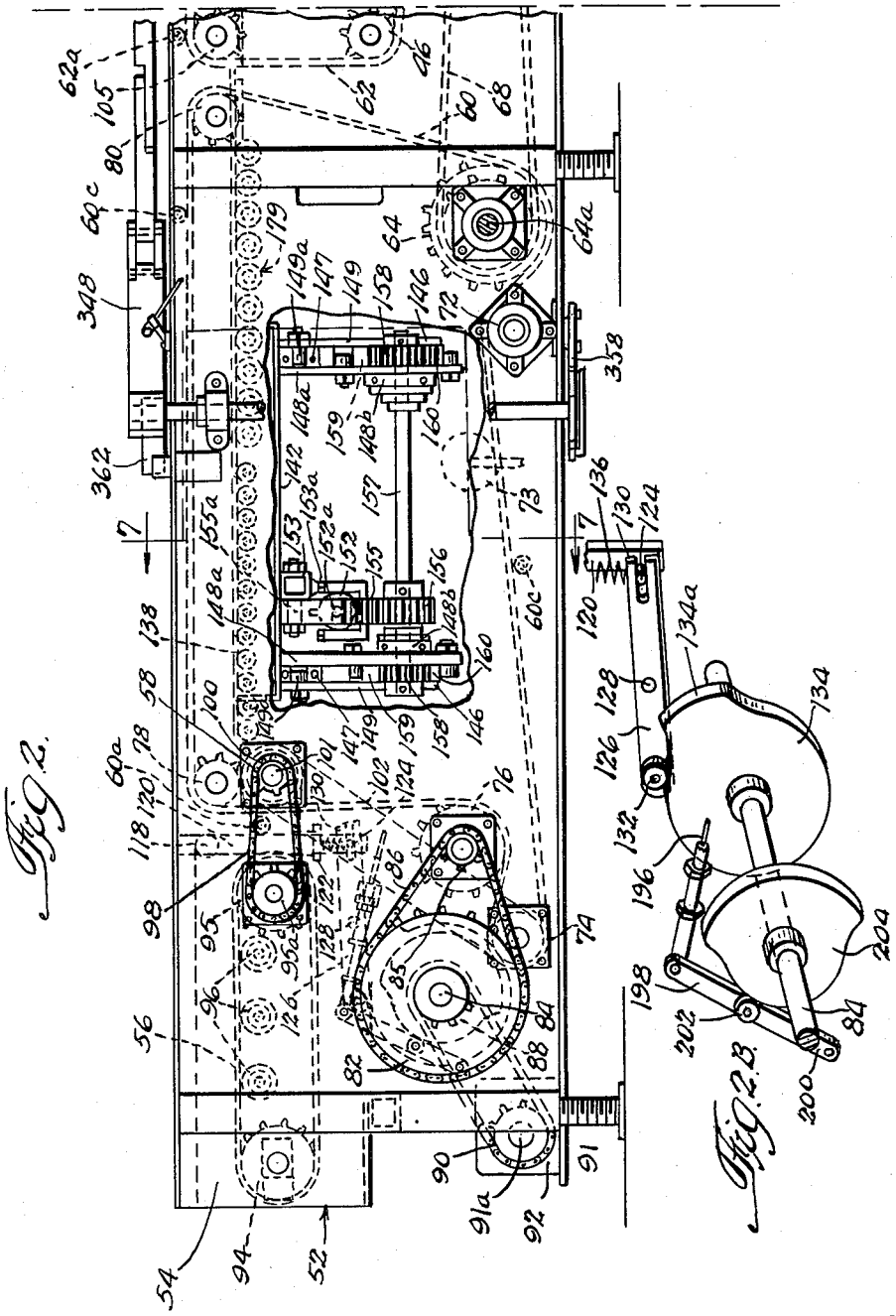

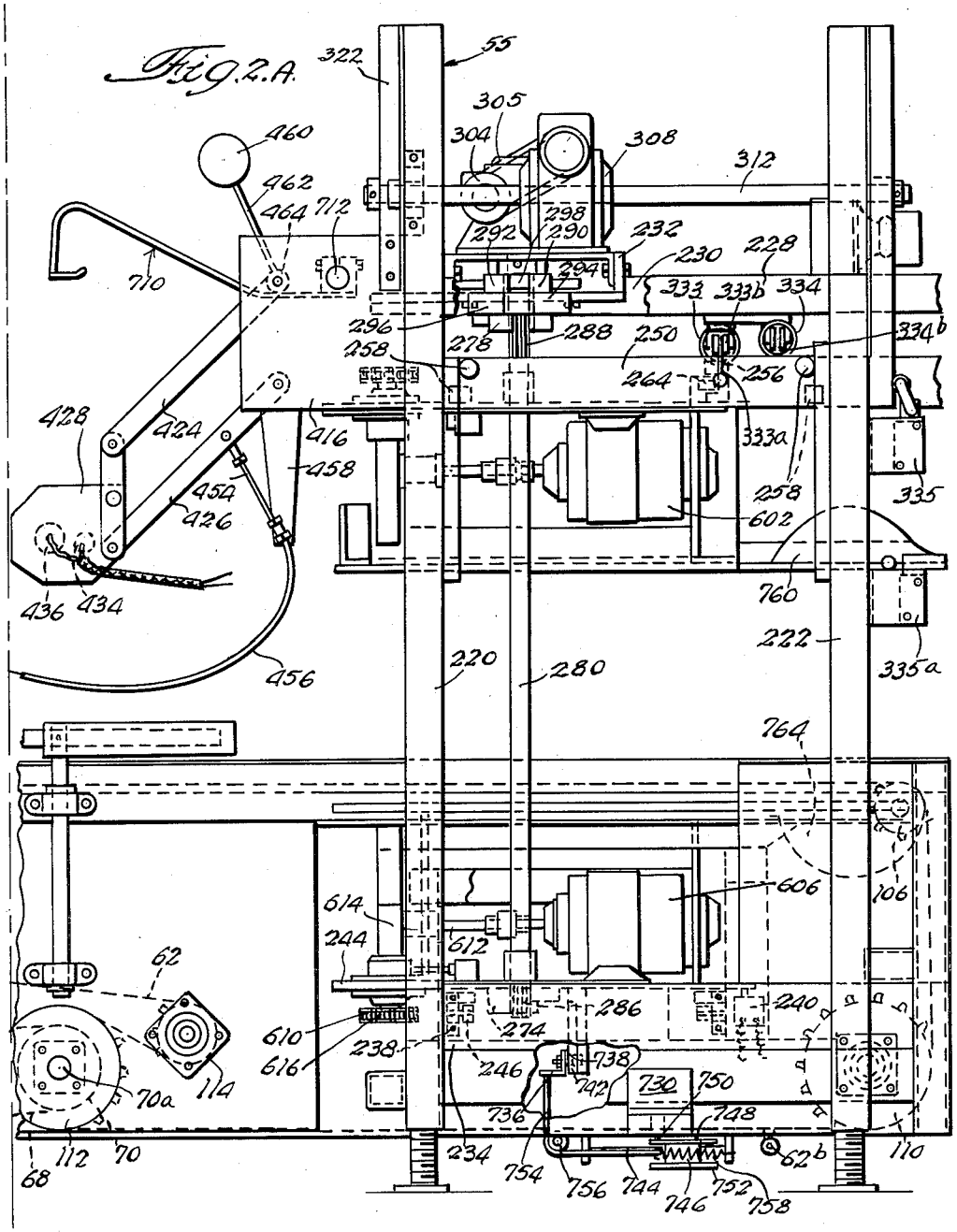

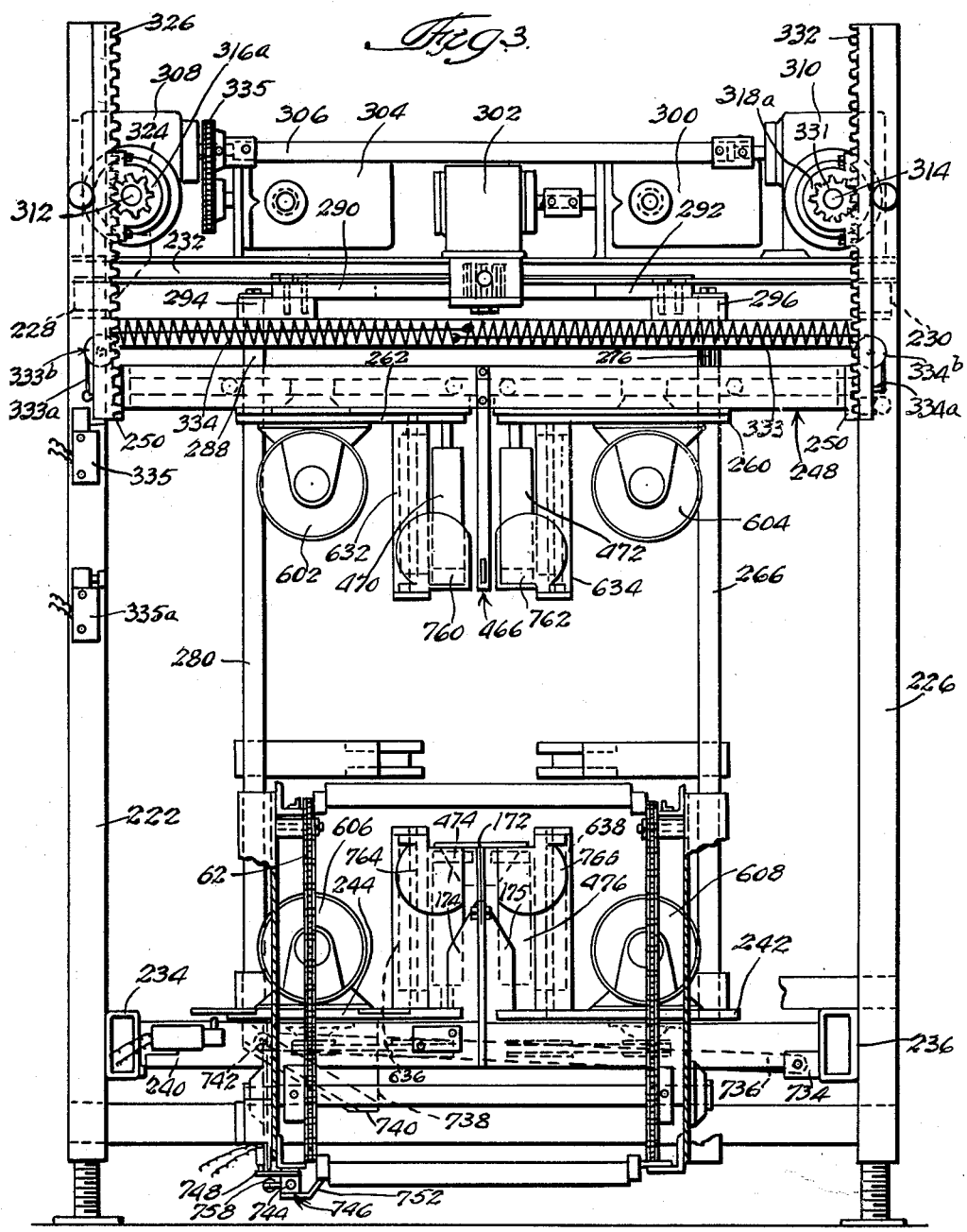

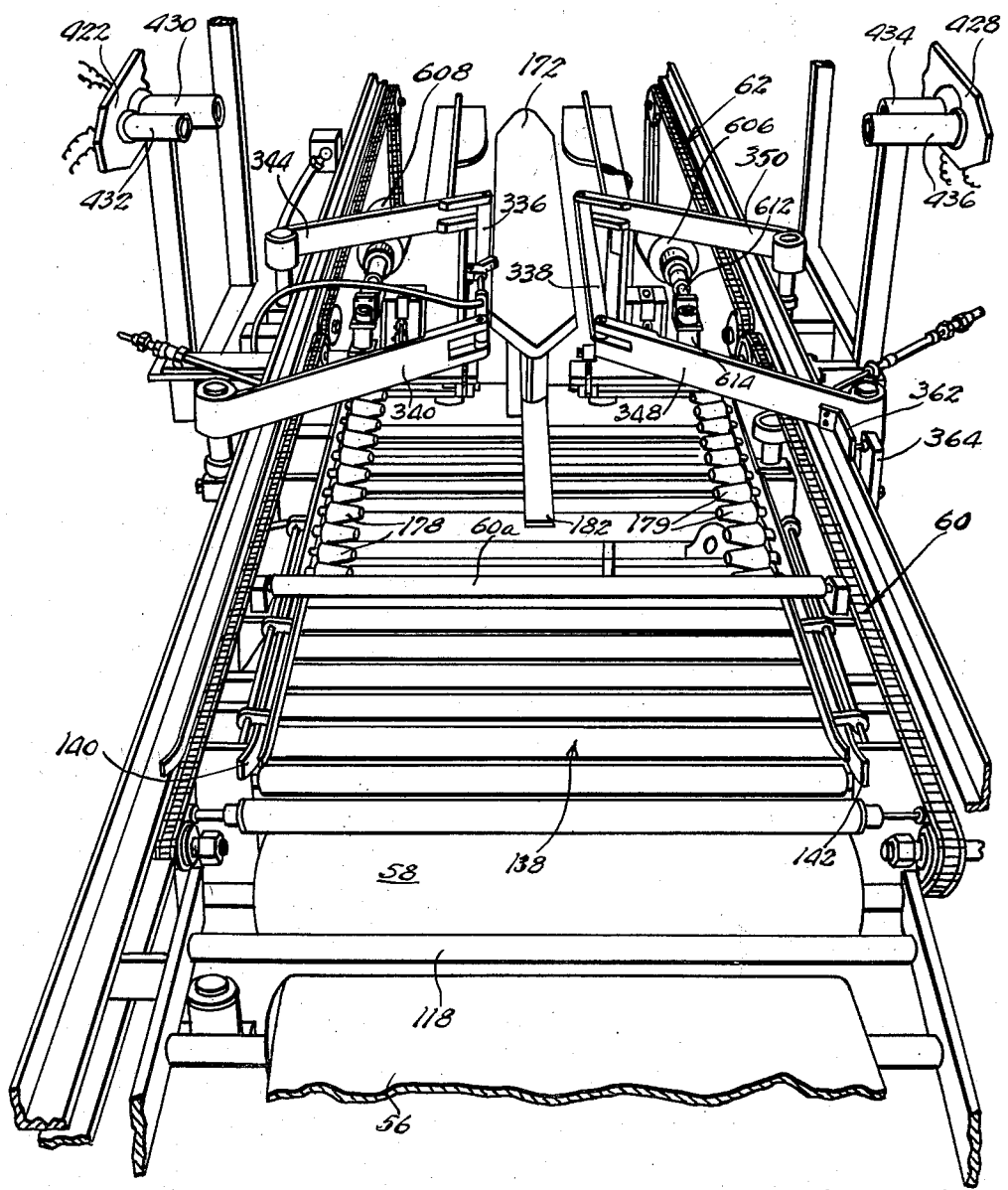

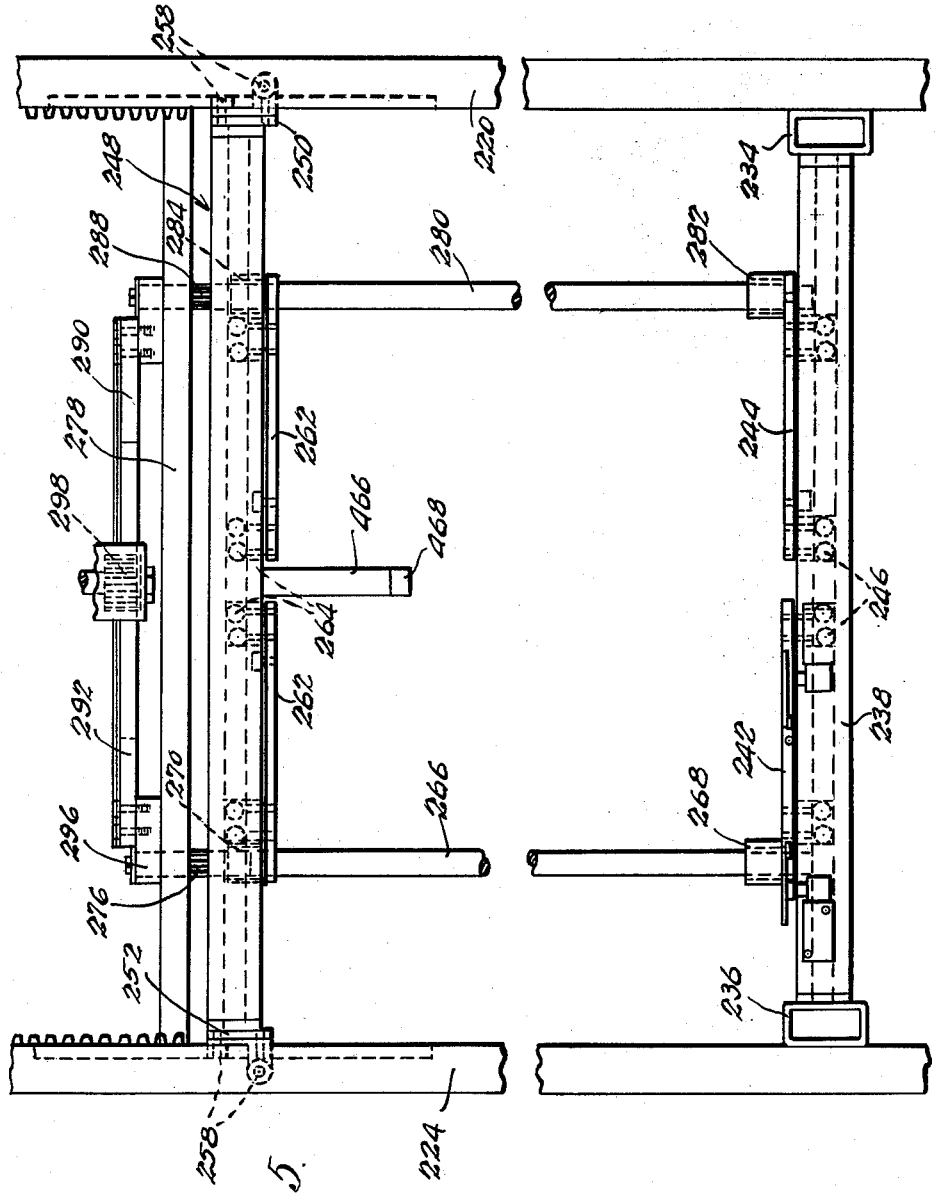

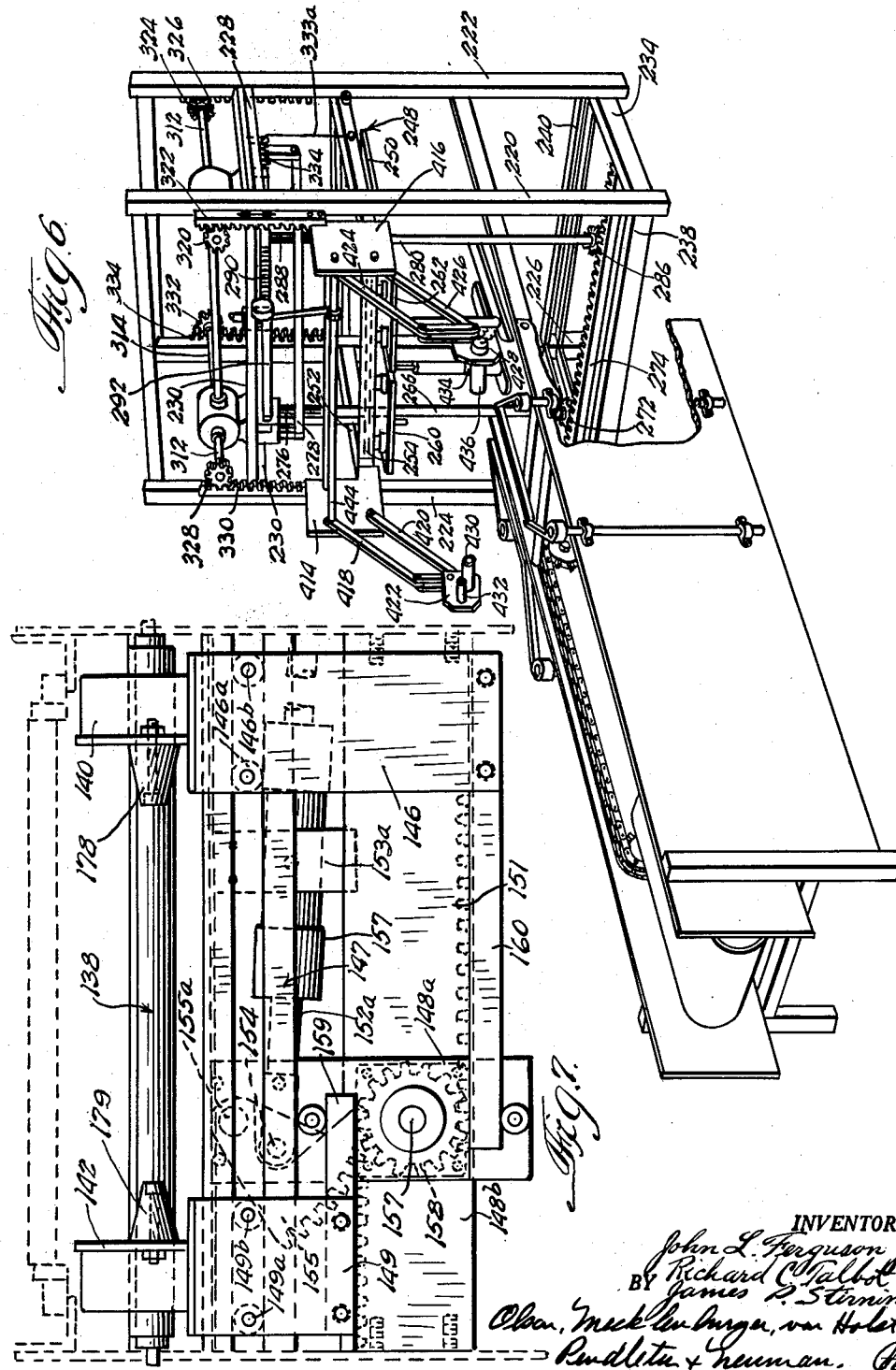

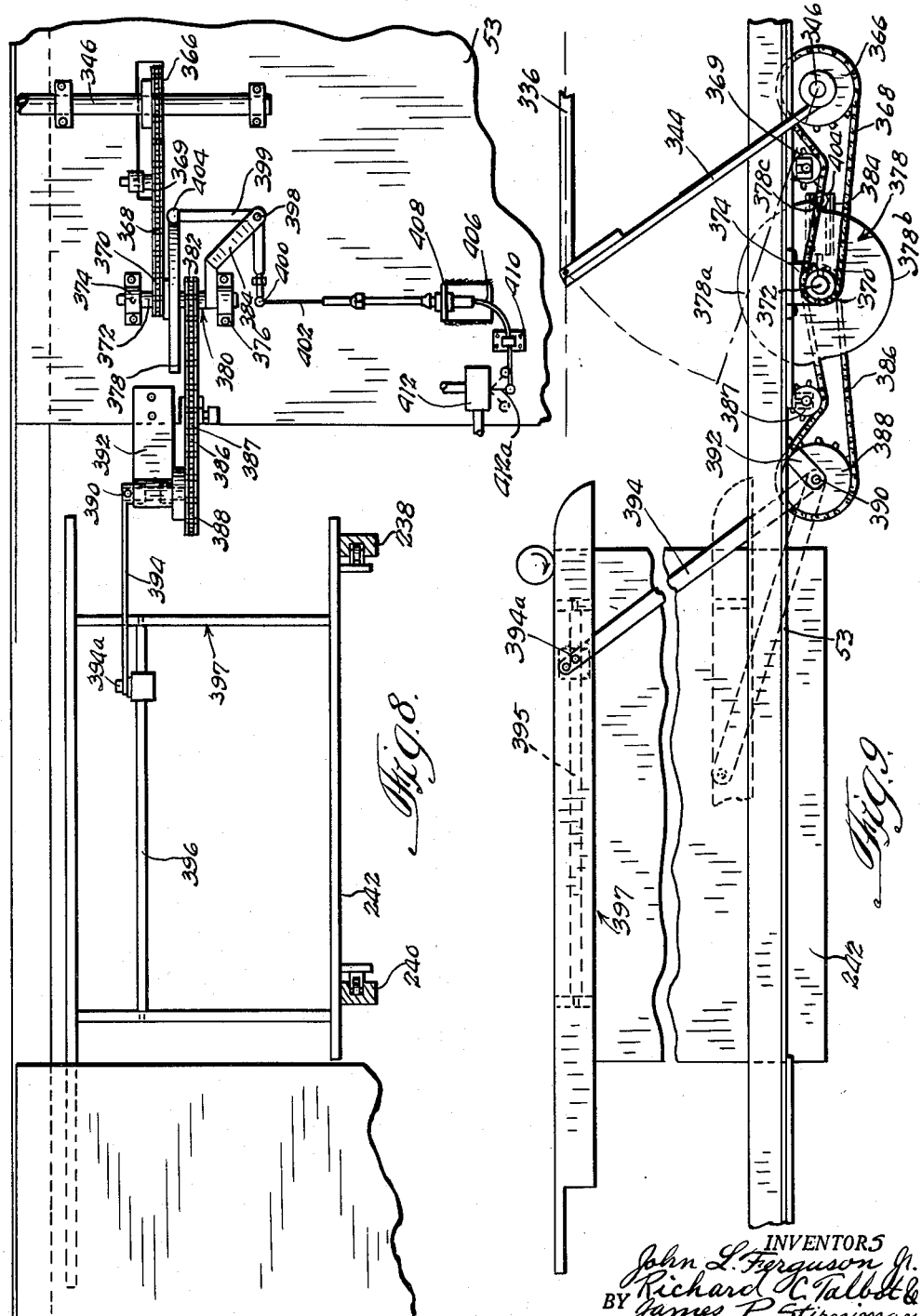

April 16, 1963   J. L. FERGUSON, JR., ET AL   3,085,376
CASE SEALING APPARATUS
Filed Feb. 23, 1960   20 Sheets-Sheet 10
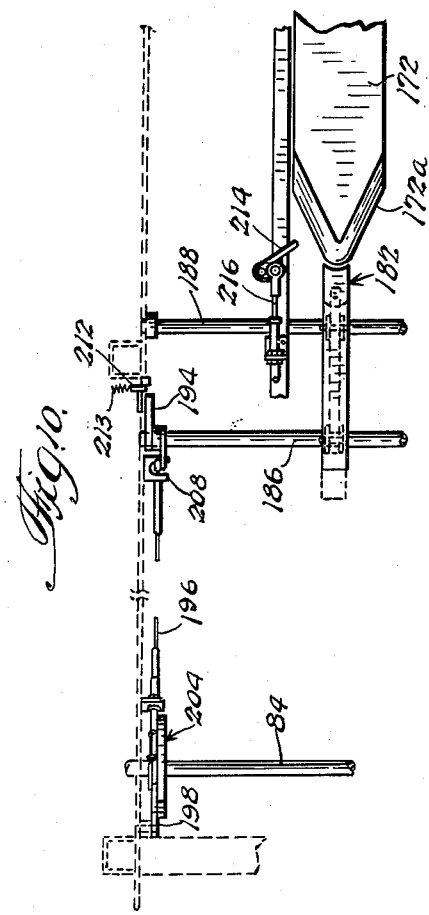
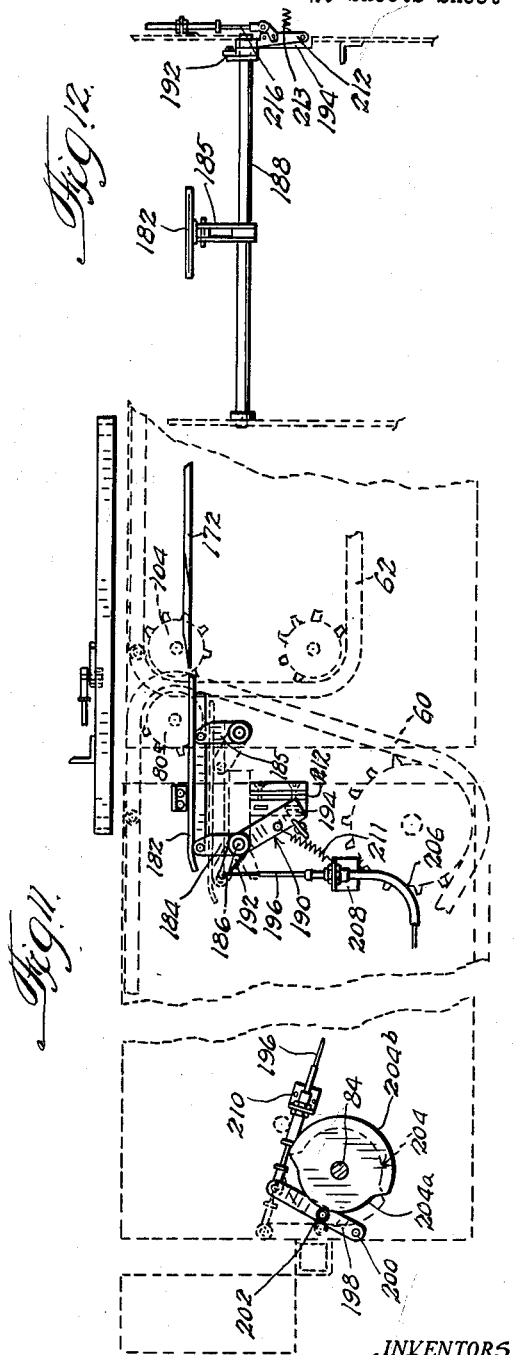
INVENTORS
John L. Ferguson Jr.
BY Richard C. Talbot &
James P. Stirniman

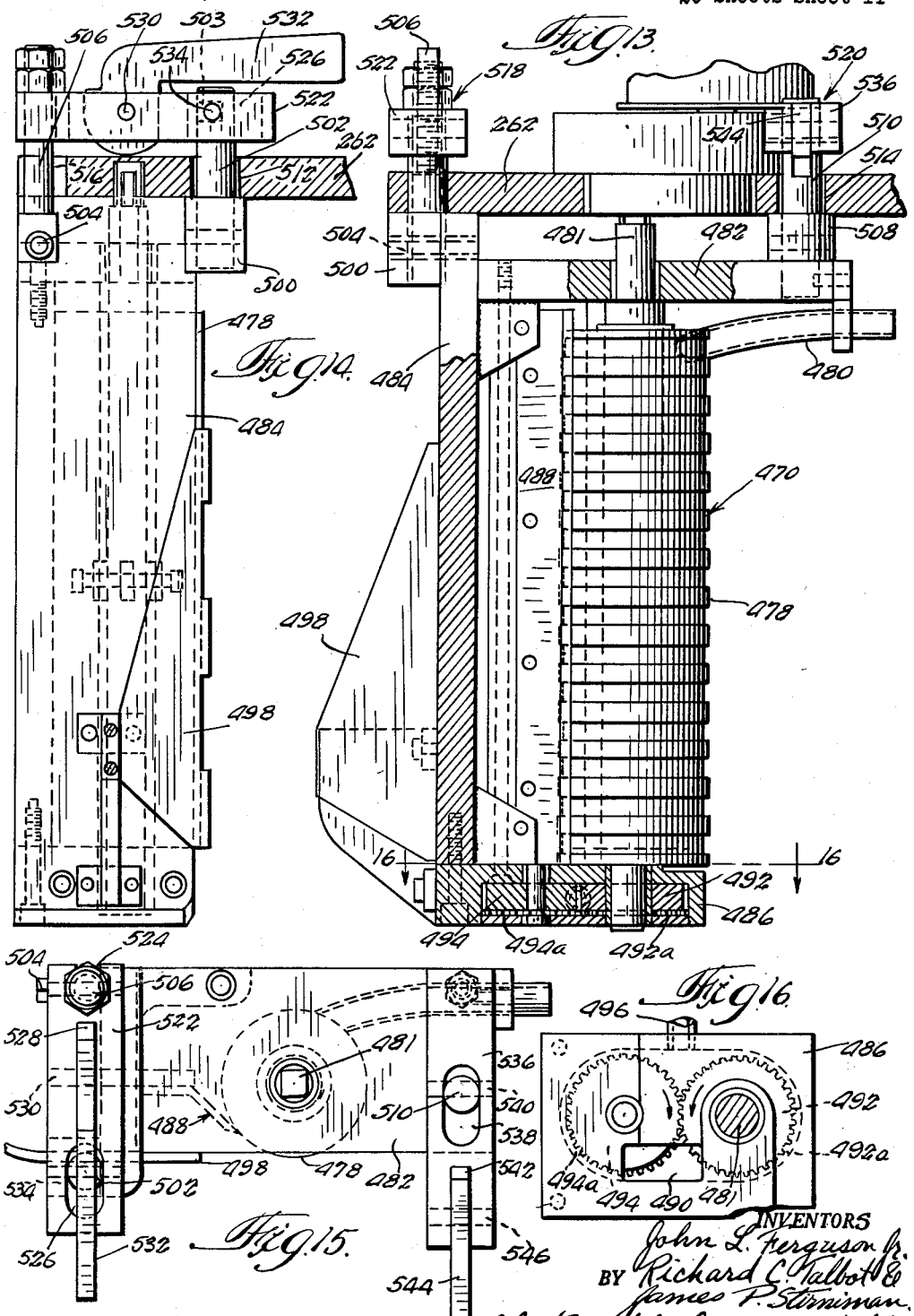

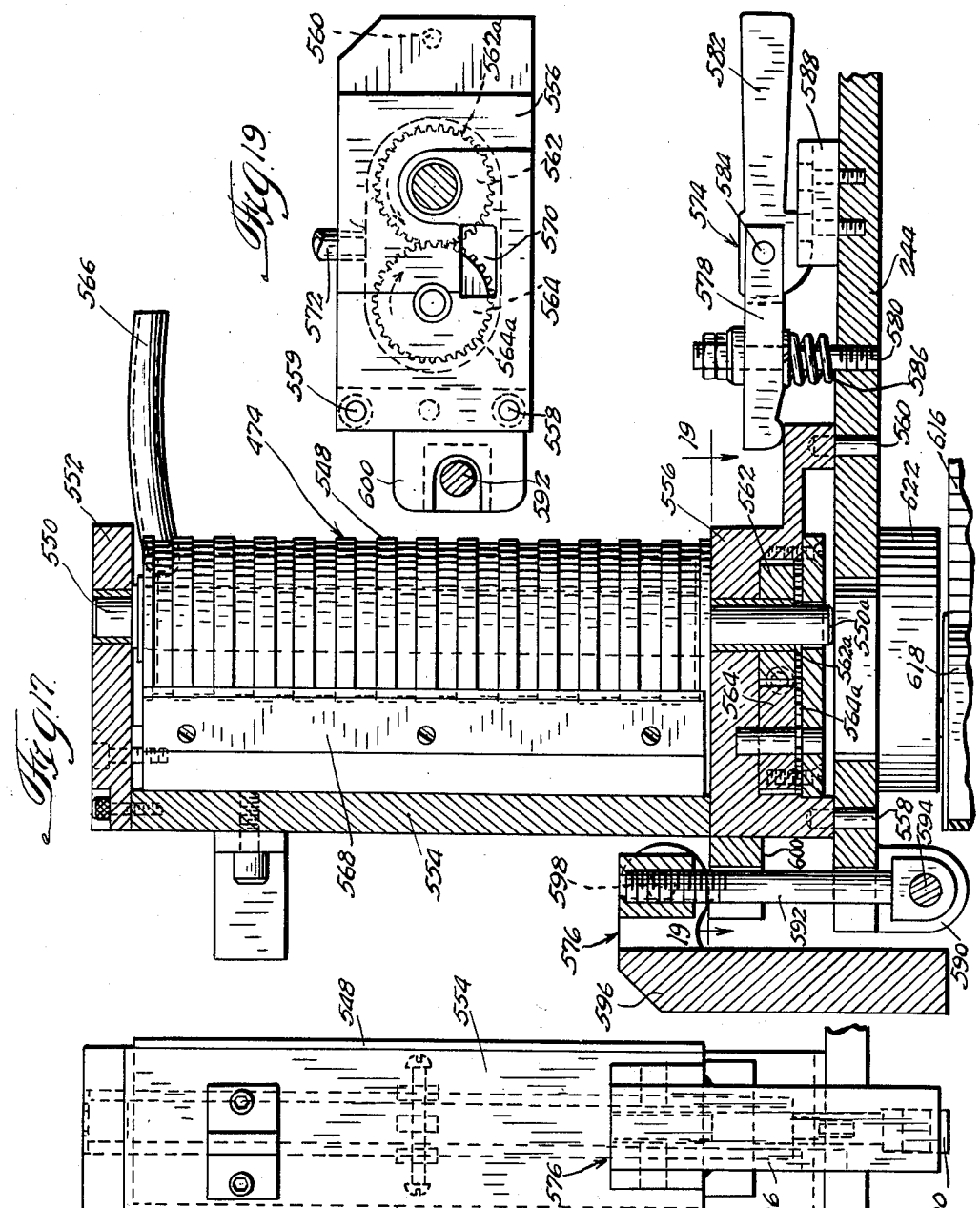

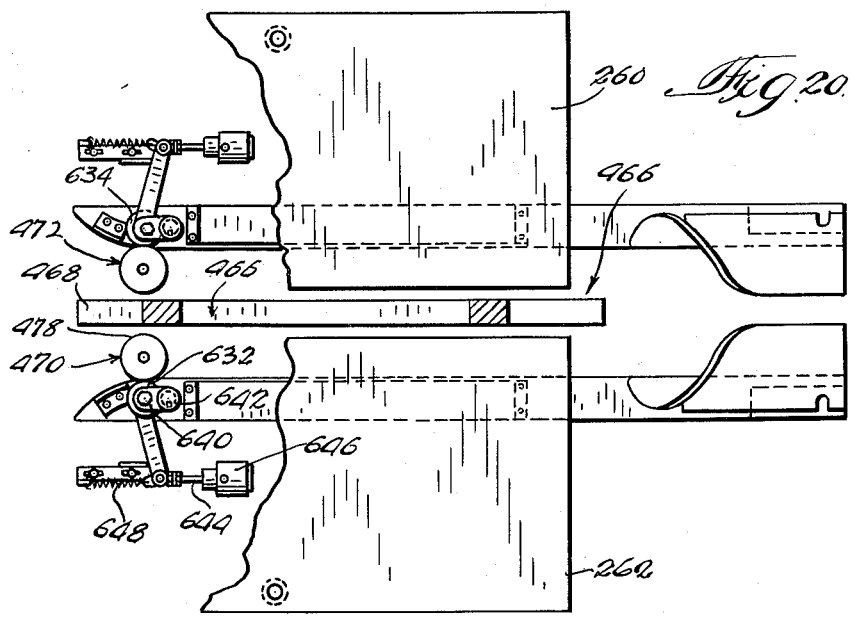
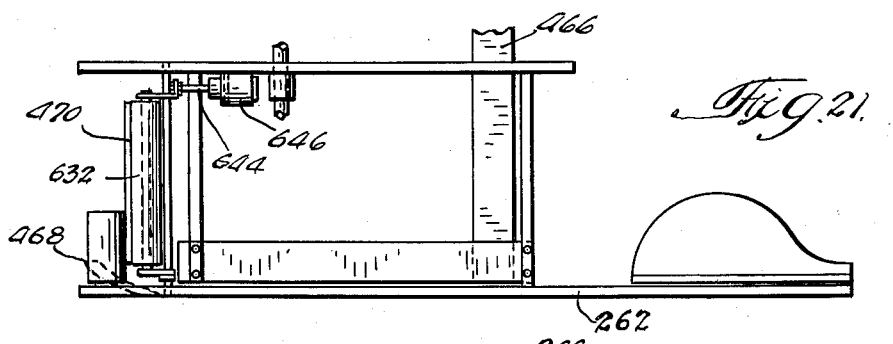
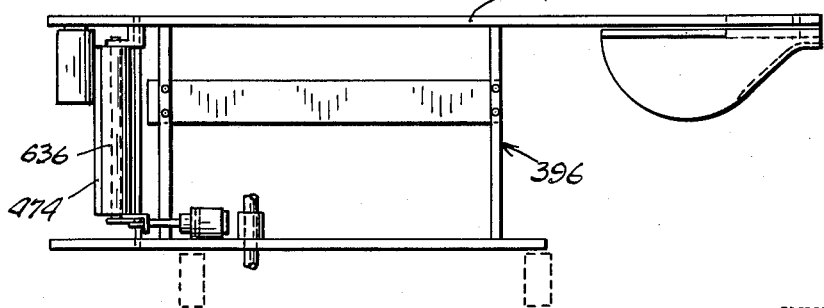

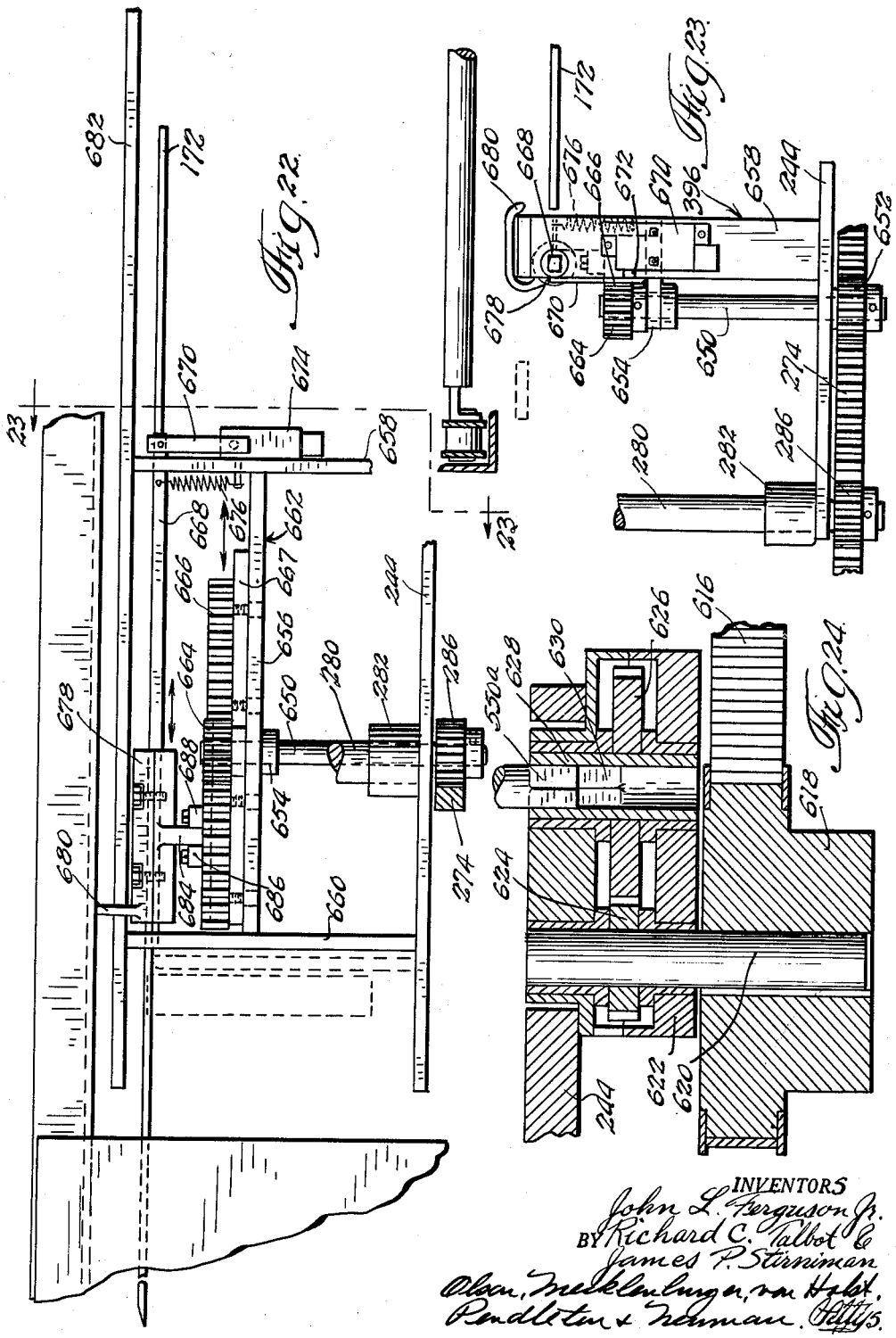

April 16, 1963  J. L. FERGUSON, JR., ET AL  3,085,376
CASE SEALING APPARATUS
Filed Feb. 23, 1960  20 Sheets-Sheet 15

INVENTORS
John L. Ferguson Jr.
BY Richard C. Talbot &
James P. Sterniman
Olson, Mecklenburgh, van Holst,
Pendleton & Newman. Attys.

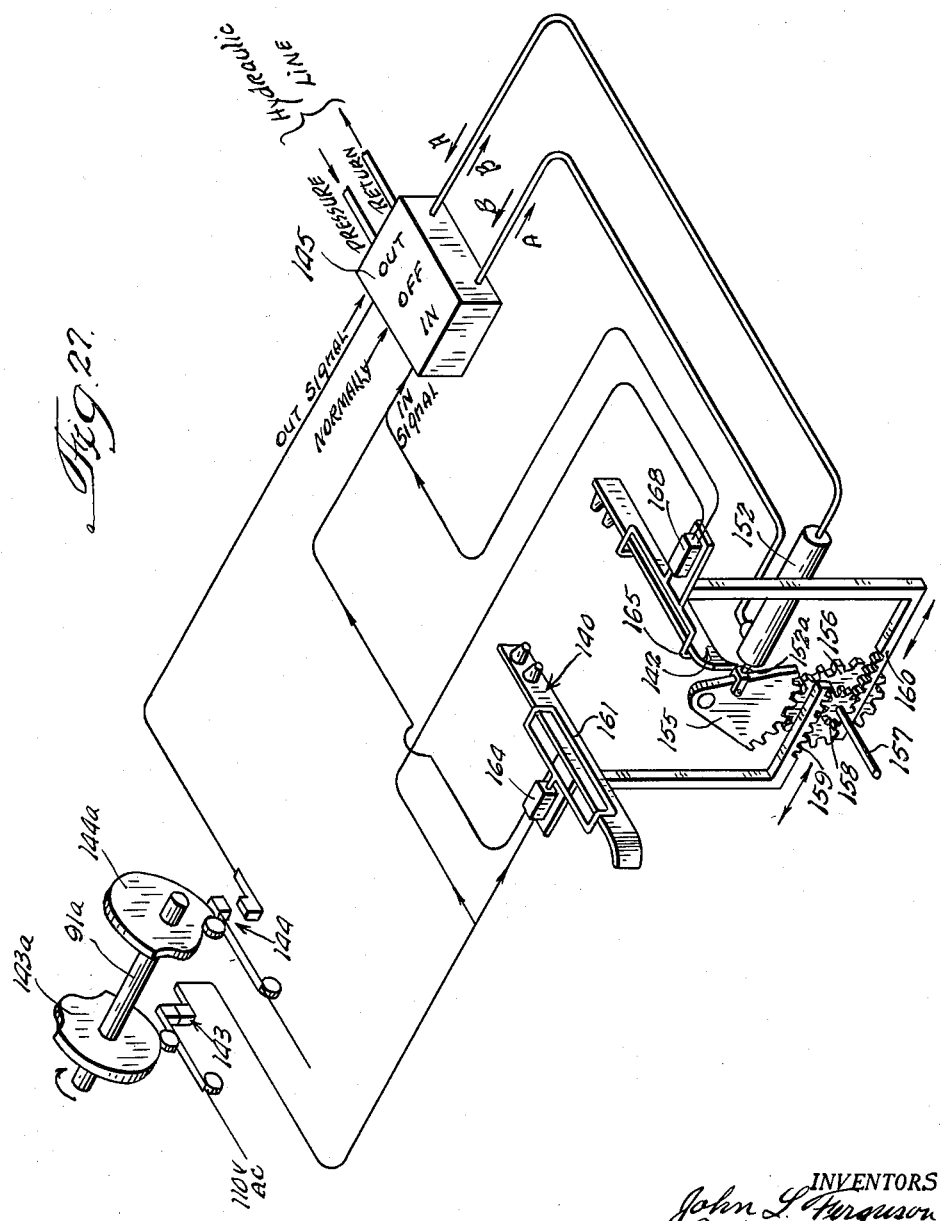

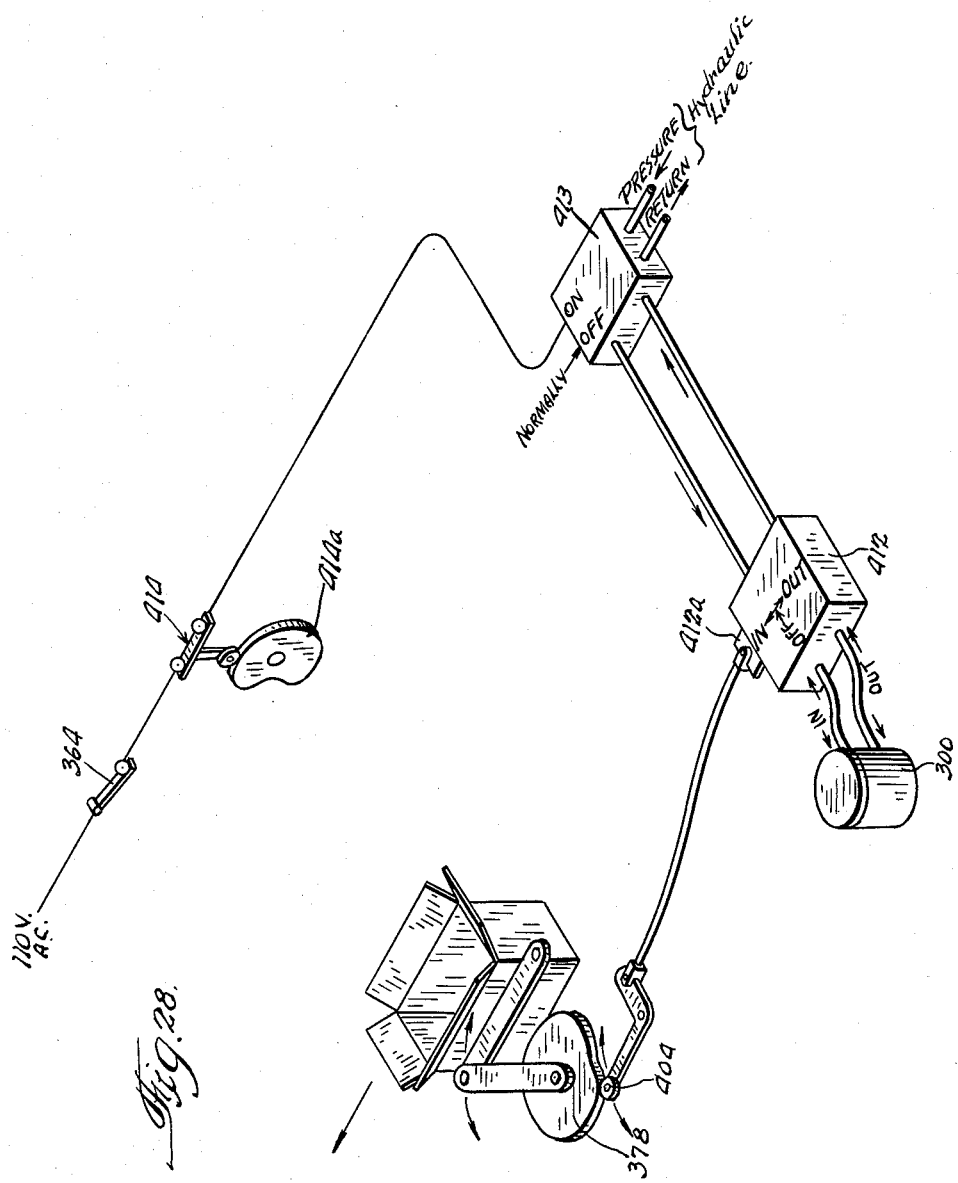

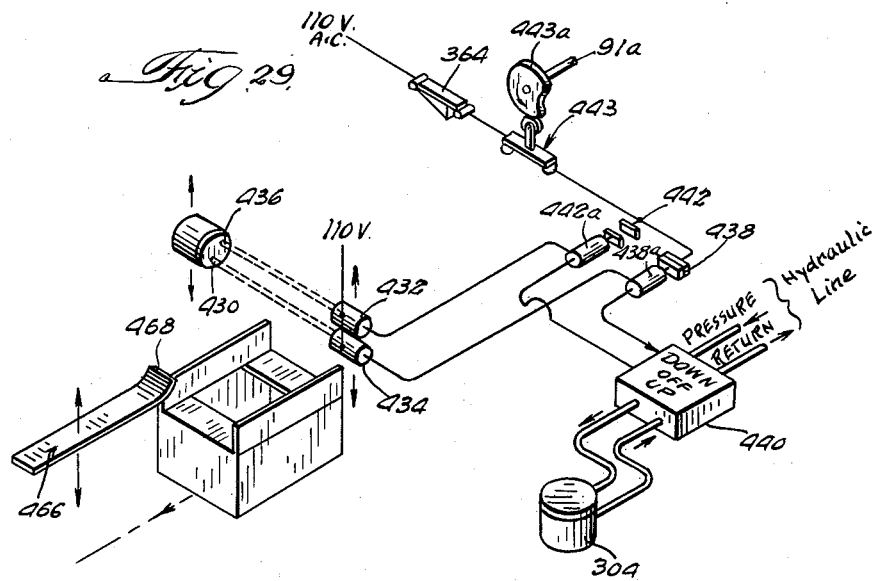
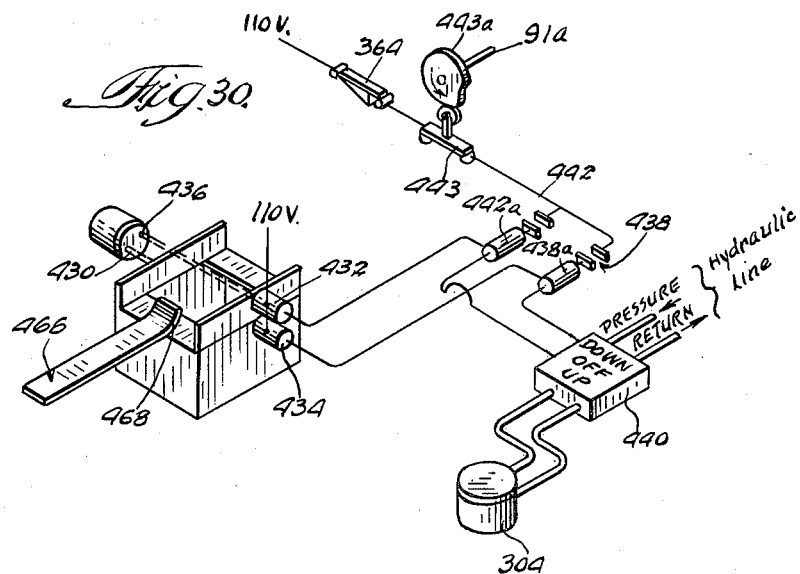

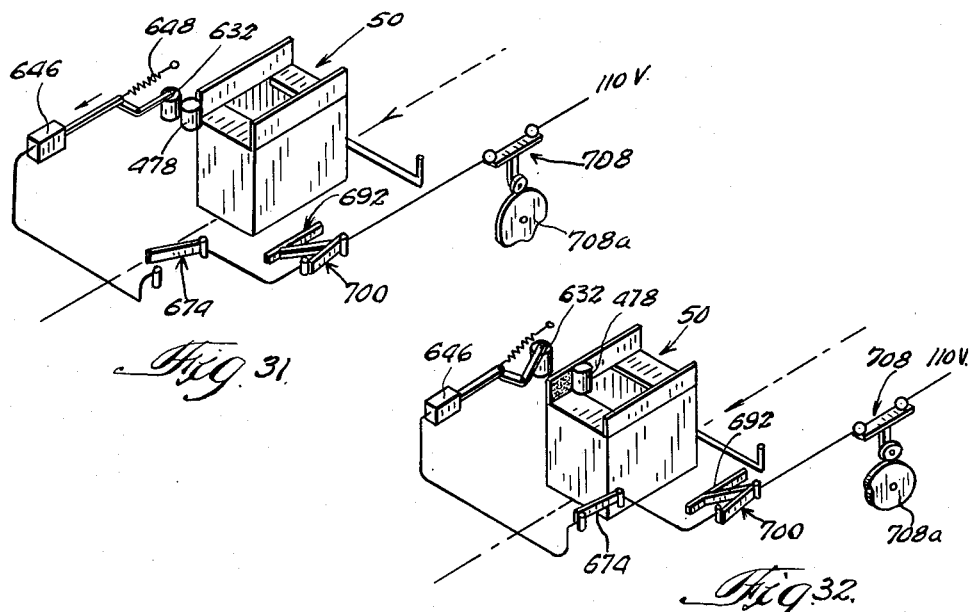
Fig. 31.
Fig. 32.
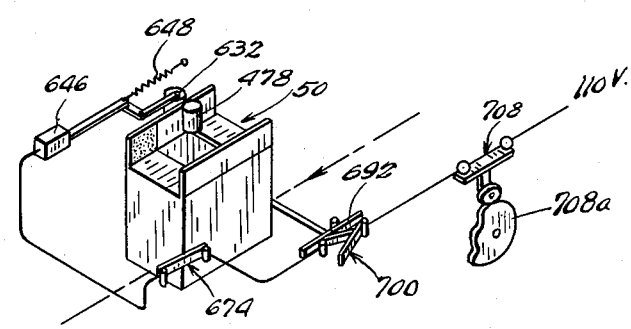
Fig. 33.
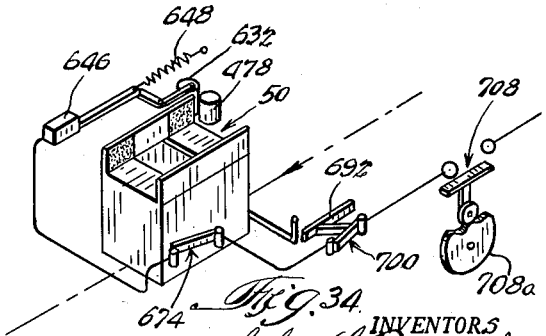
Fig. 34.
INVENTORS
John L. Ferguson Jr.
BY Richard C. Talbot &
James P. Stirniman

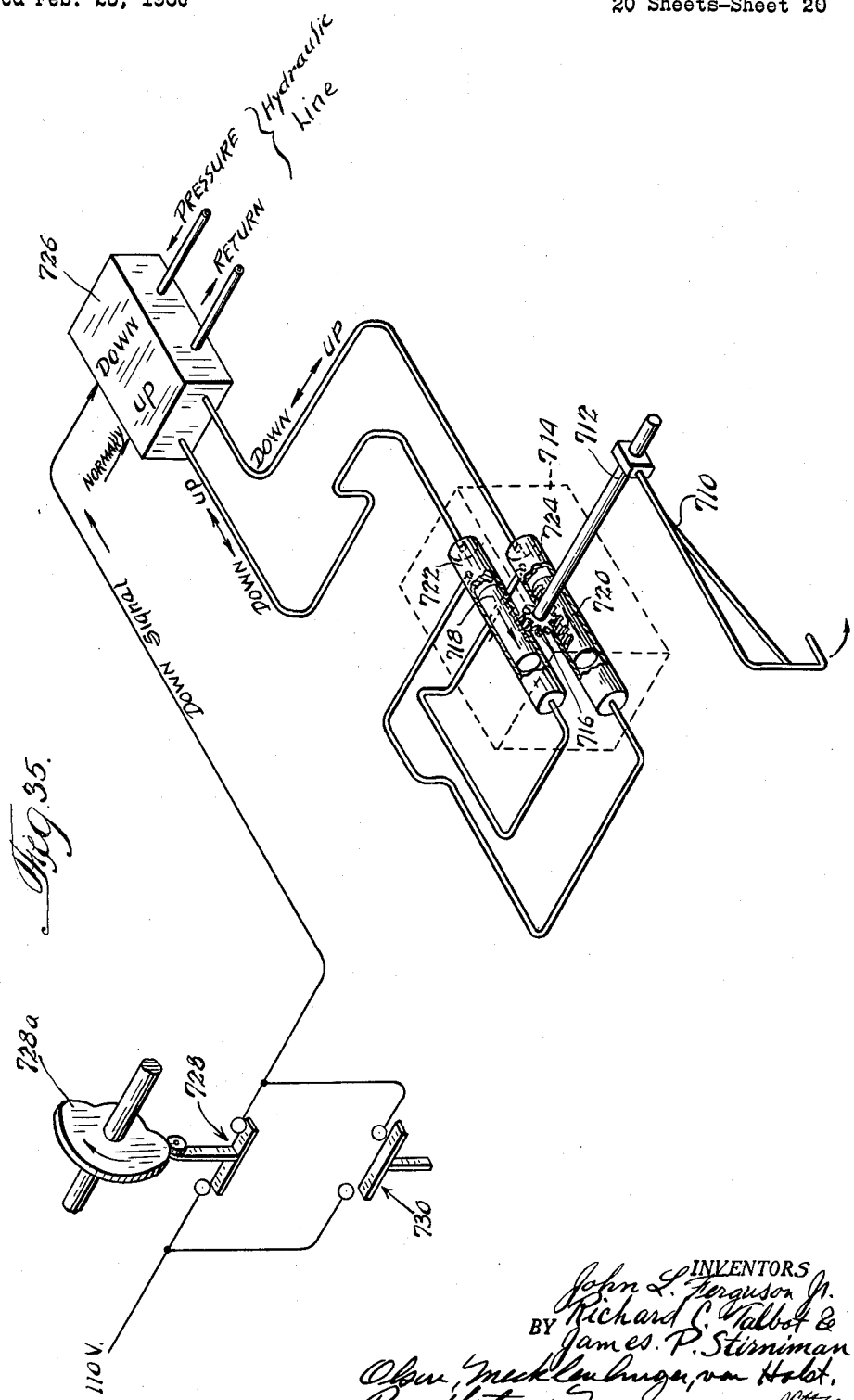

3,085,376
CASE SEALING APPARATUS
John L. Ferguson, Jr., Downers Grove, Richard C. Talbot, Joliet, and James P. Stirniman, Channahon, Ill., assignors, by mesne assignments, to Textile Machine Works, a corporation of Pennsylvania
Filed Feb. 23, 1960, Ser. No. 16,905
34 Claims. (Cl. 53—75)

This invention relates to an apparatus for sealing cardboard cartons, and more particularly to an apparatus which is adapted to receive cartons of various dimensions, to quickly and automatically adjust itself to these carton dimensions and to effect sealing of the carton flaps. It is an object of this invention to provide such an apparatus.

Prior to this invention in order to mechanically seal cartons of various sizes, it was necessary to either employ a sealing machine for each size carton or to employ a machine which was manually adjustable or could be manually set to adjust itself to accommodate various specific carton sizes. In those plants where cartons of each size are being continually filled and conveyed to the sealer at a rate approximating the capacity of a single sealing machine, the use of a sealing machine for each size carton is often quite satisfactory. However, in many plants if multiple sealing lines were employed, much of the equipment would be idle for one reason or another, possibly because the quantity of cartons being sealed may be small, or because there may be a temporary shutdown of the production line for one or more sizes, or because the orders for cartons of one or more sizes may not be as great as for cartons of other sizes. One significant step toward solution of this problem was the development of a carton sealer which could be manually adjusted or manually set to adjust itself to accommodate cartons of various specific sizes. The manual adjustments, however, require time to complete even if aided by powered adjusting mechanisms, and at production line speeds it would be impractical for the operator to attempt to make an adjustment for each carton as it moves into the machine. As a result when this type machine is used cartons are usually fed to it one size at a time which often necessitates storage conveyor systems, and if various sizes of cartons are fed from each production line, sorting and collecting mechanisms may also be required. Also, heretofore, if special size cartons were to be sealed, either special machines had to be constructed, or in the case of the adjustable machine special control mechanisms were often required in order to adapt the machine for the accommodation of such cartons.

It is one object of this invention to provide a carton sealing apparatus which will handle a large range of carton sizes in any continuing random order automatically and without the necessity of manual adjustments or settings.

It is another object of this invention to provide a carton sealing apparatus which is extremely efficient and which provides the maximum utilization of floor space area and the most efficient use of personnel.

It is another object of this invention to provide a fully automatic sealing apparatus which will adjust to cartons of various sizes and which will in many instances be able to replace a number of sealing machines of less versatility and adaptability.

It is an additional object of this invention to provide a carton sealing apparatus which is fully adjustable for accommodating cartons of varying width and height, the adjustments for which are made quickly and without lost motion.

It is still a further object of this invention to provide a fully automatic carton sealing apparatus, the adjustments of which are made quickly and smoothly to suit each particular carton regardless of whether the carton is of special or regular size.

It is another object of this invention to provide a carton sealing apparatus for handling a wide variety of carton sizes without requiring expensive storage conveyors or collecting and sorting devices and their complex control systems.

It is still another object of this invention to provide a carton sealing apparatus which is very efficient and which operates continuously at a desired constant speed with little susceptibility to wear of its various parts.

It is an additional object of this invention to provide a carton sealing apparatus in which cartons of various sizes are centered in preparation for automatic and controlled adjustment of the glue-applying and flap-manipulating mechanisms.

It is a further object of this invention to provide a fully automatic carton sealer which will adjust to cartons of various sizes fed in random order, eliminating manual carton sealing machine adjustments, multiple installations of carton sealing machines, the need for storage conveyors, and the intricate controls required therefor.

Other objects will be seen, and a fuller understanding of this invention may be had by referring to the following description and claims taken in conjunction with the accompanying drawings.

The apparatus constructed in accordance with this invention is adapted to accommodate and seal regular slotted corrugated cartons in which the width of both the inner and outer flaps is approximately equal to one half the width of the carton. The apparatus will automatically adjust to cartons of various sizes and dimensions and will effectively perform sealing operations on these cartons. After they have been filled the cases or cartons are fed to the machine in random or any desired order with the bottom flaps closed and with the top flaps open and substantially erect.

The apparatus comprises a frame having suitable conveyor means thereon for conveying the cartons in a predetermined direction and in a predetermined sequence. The cartons are fed to the conveyor means with the sides from which the exterior flaps extend oriented generally in the predetermined direction of carton travel. Means on the apparatus exactly positions and centers the cartons on the conveyor.

Mounted on the frame for relative vertical positioning with respect to the conveyor means is a subframe. A first pair of supports is mounted on the frame below the subframe for lateral or horizontal adjustment relative to one another. A second pair of supports is mounted on the subframe for relative horizontal or lateral adjustment with respect to each other. Means is provided for operatively interconnecting one of the first pair of supports with a corresponding one of the second pair of supports, and similar means is provided for interconnecting the remaining supports of each pair. Thus, the first and second pair of supports may be moved in unison throughout their entire range of lateral adjustments. Means is provided on each of the four supports for applying glue to and subsequently folding closed one of the four outer flaps of the carton.

Carton support means attached to the frame intermediate the first pair of supports upholds the carton with the bottom inner or end flaps closed and with the bottom outer or side flaps open for the application of glue thereto. Preliminary flap opening means ahead of the carton support means opens the bottom outer flaps just sufficiently to permit the carton to be moved onto the carton support means without dropping any of the contents of the carton. Lower flap lifting means intermediate the carton support means and the preliminary flap opening means lifts the slightly lowered outer flaps into approximately their original closed position and upholds the bottom rear flap and contents of the carton after the leading end of the carton has been moved onto the forward or receiving tip of carton support means. This prevents either the contents or the rear inner flap from snagging on the carton support means.

A first sensing means determines the width of the carton as the carton is in transit through the apparatus, and means responsive to this first sensing means effects corresponding horizontal adjustment of the first and second pair of supports. A second sensing means determines the height of the carton, and means responsive to this second sensing means effects the vertical adjustment of the subframe with the second pair of supports mounted thereon. Front flap closing means mounted on the subframe effects closing of the front flap of the container as the container moves into the area between the supports for the application of glue to the outer flaps. Means is also provided for effecting a glue skip in the central area of the outer flaps, and a rear flap tucker folds the rear top flap of the container closed, so that this flap may move under the front flap closing means, and both front and rear flaps will be closed when the outer flaps are folded closed subsequent to the application of glue thereto.

One of the features of this invention is the means for determining the width of each carton as it is in transit through the apparatus. Another feature of the invention is the means for determining the height of each carton as it is in transit through the machine. The means for performing each of the various corelated functions are of equal importance; each mechanism providing maximum efficiency and control, and each mechanism being particularly adapted for automatic operation in proper sequence with minimum maintenance and adjustment.

With respect to the drawings:

FIGURE 1 is a top plan view of the apparatus constructed in accordance with this invention showing the forward or carton receiving end of the apparatus;

FIG. 1A is a top plan view of the apparatus showing the exit end of the machine;

FIG. 2 is a side elevation view of the carton receiving end of the machine as illustrated in FIG. 1;

FIG. 2A is the side elevation view of the exit end of the machine as illustrated in FIG. 1A;

FIG. 2B is a perspective view of a portion of the mechanical timing mechanism for the machine;

FIG. 3 is an end elevation view of the apparatus from the exit end thereof;

FIG. 4 is a perspective view of a portion of the machine illustrating the conveying means, portions of the width and height-sensing means and the carton support means;

FIG. 5 is an end elevation view of portions of the frame and superstructure illustrating the mounting of the subframe and the supports;

FIG. 6 is a schematic perspective view of the apparatus illustrating portions of the various height and width adjusting mechanisms;

FIG. 7 is a transverse sectional view taken substantially along line 7—7 of FIG. 2 and illustrating the means for centering and positioning the cartons on the conveyor;

FIG. 8 is a side elevation view of a portion of the apparatus illustrating the width-sensing mechanism;

FIG. 9 is a top plan view of the width-sensing mechanism illustrated in FIG. 8;

FIG. 10 is a top plan view of the lower flap lifting means;

FIG. 11 is a side elevation view of the lower flap lifting means;

FIG. 12 is an end view of the mechanisms illustrated in FIGS. 10 and 11;

FIG. 13 is an enlarged side elevation view of one of the upper glue applicator rolls and its associated mechanisms;

FIG. 14 is an end elevation view of the glue roll and the associated mechanisms illustrated in FIG. 13;

FIG. 15 is a top plan view of the glue roll and mechanisms illustrated in FIG. 13;

FIG. 16 is a sectional view taken substantially along line 16—16 of FIG. 13;

FIG. 17 is a side elevation view of one of the lower glue applicator rolls and its associated mechanisms;

FIG. 18 is an end elevation view of the glue roll and mechanisms illustrated in FIG. 17;

FIG. 19 is a sectional view of the glue roll and its mechanisms taken substantially along line 19—19 of FIG. 17;

FIG. 20 is a top plan view, partially in section, of a portion of the apparatus illustrating the upper pair of supports and the mechanisms mounted thereon for applying glue to and for closing the outer flaps of the carton;

FIG. 21 is a side elevation view of the structure of FIG. 20 illustrating an upper and a lower support and the glue-applying and flap-closing mechanisms mounted thereon;

FIG. 22 is a side elevation view of a portion of the apparatus illustrating the mechanism for controlling the start of the glue skip;

FIG. 23 is a sectional view taken substantially along line 23—23 of FIG. 22 and further illustrating the mechanism for controlling the start of the glue skip;

FIG. 24 is an enlarged sectional elevation view of the gearing for the glue rolls;

FIG. 27 is a schematic illustration of the means for centering the carton in the machine and for adjusting the preliminary flap opening means;

FIG. 28 is a schematic illustration of the width-sensing means;

FIG. 29 is a schematic illustration of the height-sensing means showing the operation thereof to effect downward adjustment of the subframe;

FIG. 30 is a schematic illustration of the apparatus illustrated in FIG. 29 showing the operation of this mechanism when the height of the carton has been determined, and the height adjustment has been made;

FIG. 31 is a schematic illustration of the operation of the glue skip when the carton is just entering the glue rolls;

FIG. 32 is a schematic illustration of the glue skip at the instant the trip on the glue skip start mechanism has been engaged by the carton to effect start of the glue skip;

FIG. 33 is a schematic illustration of the glue skip mechanism at the instant the trip on the glue skip termination mechanism has been engaged by a portion of the carton conveying means to signal the end of the glue skip;

FIG. 34 is a schematic illustration of the glue skip mechanisms illustrating the operation of these mechanisms when the carton has passed the glue rolls; and FIG. 35 is a schematic illustration of the mechanism for operating the rear flap tucker.

Figure 25:
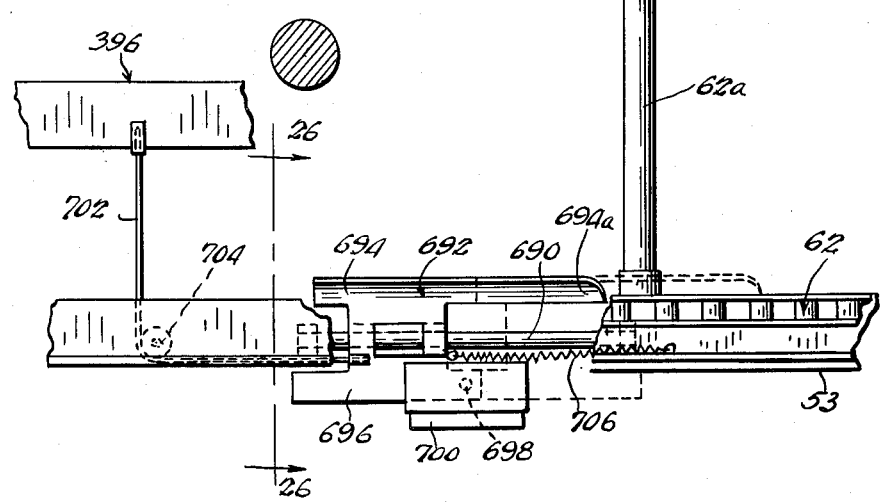
FIG. 25 is a top plan view of a portion of the apparatus illustrating the mechanism for controlling the termination of the glue skip.

The apparatus constructed in accordance with this invention is adapted to seal any regular slotted corrugated case or carton 50 within the size range as determined by the size of the apparatus itself. In this type carton the inner and outer flaps are of equal width, each being approximately one half the width of the carton. The cartons 50 are fed to the apparatus in any desired order with the bottom inner or end flaps 50a and 50b folded in, and the bottom side or exterior flaps 50c and 50d folded thereunder. The top end flaps 50e and 50f are substantially erect as are the top side flaps 50g and 50h, that is to say, the filled cartons are fed to the apparatus with their bottoms closed and their tops open.

The sealing apparatus includes an elongated, horizontally extending frame 52 having two parallel side plates 53 and 54 and a vertically extending superstructure 55 as best illustrated in FIG. 2A. The cartons 50 are conveyed through the apparatus by suitable conveying means which includes an infeed belt conveyor 56, a rapid feed roll 58, a first flight 60 and a second flight 62. The first flight 60 comprises a pair of parallel chains of equal length and identically mounted on opposite sides of the apparatus. These chains have three transverse flight bars 60a, 60b and 60c mounted therebetween at evenly spaced intervals. The second flight also comprises a pair of parallel chains of equal length and identical mounting between which are mounted at equally spaced intervals two transverse flight bars 62a and 62b. The first flight 60, and in fact the entire conveyor system as well as the electrical and mechanical timing mechanisms, are driven by means of a motor 63 through a friction clutch 63a and sprockets 64, which are interconnected through a transverse shaft 64a. The power is transmitted to the second flight 62 by means of a sprocket 66 mounted on shaft 64a, a chain 68 and a sprocket 70 mounted on a transverse shaft 70a. This transmission is best seen in FIGS. 1 and 1A and provides a timed interconnection between the two flights.

As best seen in FIG. 2 the chains of flight 60 intermesh with driven sprockets 64 (one on each side of the apparatus) and extend over idler sprockets 72, and under tensioning sprockets 73 which are urged by springs into engagement with their respective chains. Thence the chains extend about drive sprockets 74, under other drive sprockets 76, over top idler sprockets 78 and 80 and then back to driven sprockets 64. The flight bars 60a, 60b and 60c extending between the flight chains are effective to convey cartons between top idler sprockets 78 and 80. A large sprocket 82, keyed to a transverse shaft 84, is driven by means of a chain 86 which is in engagement with a small sprocket 85 mounted on the transverse shaft interconnecting drive sprockets 76. Drive sprocket 85, by its size, provides a peripheral speed reduction, and the connection of this small sprocket to large sprocket 82 provides an additional speed reduction. Also keyed to shaft 84 is a sprocket 88 about which a chain 90 extends. Chain 90 drives the sprocket 91 on the operating shaft 91a of an electrical camming mechanism 92 which is adapted to provide timed operation of the various electrical systems in the apparatus.

The belt infeed conveyor 56 is mounted about two end rolls 94 and 95 over three intermediate supporting rolls 96. End roll 94 is an idler roll, and to the shaft of end roll 95 is connected a sprocket 95a which is driven by a chain 98 that extends about a sprocket 100 mounted on a transverse shaft 101. A chain 102 on the opposite side of the apparatus extends about a sprocket 103 also mounted on shaft 101 and about a sprocket 104 mounted on the transverse shaft interconnecting drive sprockets 74. Thus, the belt infeed conveyor 76 is driven by flight 60.

Rapid speed roll 58 is mounted on the shaft 101 with sprockets 100 and 103, and thus is also driven by flight 60.

The second flight as best illustrated in FIGS. 1A, 2 and 2A is effective to convey cartons between idler sprockets 105 and idler sprockets 106. From idler sprockets 106 the chains for the second flight extend downwardly about idler sprockets 110 and then forwardly about drive sprockets 112 mounted on the transverse shaft 70a which as previously described is driven by the first flight 60 through chain 68 and sprocket 70. From drive sprockets 112 the chains for the second flight extend around idler sprockets 114 back to idler sprockets 116, illustrated in FIG. 2, and then up to idler sprockets 105.

The flights 60 and 62 are preferably operated at the same linear speed. The second flight, however, contains only two flight bars and is approximately one third longer than the first flight. The flight bars on the second flight are, therefore, spaced twice the distance of the flight bars on the first flight; and if the first flight is operated at a speed which will place a flight bar at a given point once every second, the second flight which is traveling at the same linear speed will place a flight bar at a given point every two seconds. As best illustrated in FIG. 2 the flights are spaced in close proximity such that the cartons are delivered by the first flight or into position for transporting by the second flight. Inasmuch as the flight bars on the first and second flights are timed as previously described, the carton will come to rest at the starting point of the second flight 62, where it has been delivered by the first flight 60. The period of rest will be approximately one second if the flights are operating at the speed previously indicated. As will be hereinafter further explained, this delay or slight hesitation in the movement of the carton through the apparatus provides time for the apparatus to consumate its height and width adjustments.

It will be apparent from the foregoing that each of the conveyors, that is, the infeed belt 56, the rapid feed roll 58, the first flight 60 and the second flight 62 are all operated in time with one another, the power for each being supplied by motor 63, and all of these conveyors are constantly in operation.

Intermediate the infeed belt 56 and rapid feed roll 58 is a stop bar 118 which is connected to a vertical operating rod 120. Rod 120 extends through and is slidably movable within a bracket 122 mounted on the frame side plate 54, and a transverse pin 124 is carried by shaft 120 adjacent the lower end thereof (see FIG. 2B). The vertical shaft 120 is moved vertically by means of a bar 126 which is pivoted about a pin 128. One end 130 of bar 126 is bifurcated and accommodates the pin 124 carried on the lower end of the vertical shaft 120.

At the opposite end of bar 126 is a follower 132 which is in engagement with a cam disk 134 keyed on shaft 84. A spring 136 acting between pin 124 on shaft 120 and bracket 122 on the frame urges the shaft 120 upwardly toward its normal or case stopping position and simultaneously urges the counterclockwise movement of bar 126 about stationary pin 128 to maintain follower 132 in contact with cam disk 134. Cam disk 134 has a high surface portion 134a which causes the clockwise movement of the bar 126 and the downward movement of the vertical shaft 120 and the stop bar 118 once during each revolution of shaft 84.

The case stop bar 118 thus retards the incoming cases until the proper time in the machine cycle as determined by cam disk 134. At the proper time this stop bar is drawn down below the level of belt 56 and is maintained in the downward position sufficiently long for a carton to be fed by belt 56 onto the rapid feed roll 58. The feed roll 58 runs at a greater velocity than infeed belt 56, and thus the carton is actually removed from the end of infeed belt 56 by this roll, causing a separation between that carton and the next cartons in file on the infeed conveyor belt 56. At this point the high surface on cam 134 is no longer in engagement with the follower 132 on bar 126, and spring 136 is permitted to rotate bar 126 in the counterclockwise direction and raise the stop bar 118 to its normal case stopping position.

Rapid feed roll 58 moves the carton onto rollers 138 which are journalled in the frame side plates 53 and 54, as best illustrated in FIG. 1. On the rollers 138 the carton is centered. For this purpose two elongate, laterally movable carriages 140 and 142 are provided. At the proper time in the cycle of the machine these carriages, which are normally positioned adjacent the side plates 53 and 54, respectively, of the frame, are caused to move transversely inward toward each other and into engagement with the carton. The mechanism for moving these carriages is best illustrated in FIGS. 2, 7 and 27. This mechanism is set in motion by means of timing switches 143 and 144 operated by cams 143a and 144a, respectively, within electrical camming mechanism 92, and by means of a solenoid actuated valve 145, schematically illustrated in FIG. 27. Thus the movement of the carriages is timed with the flights.

A pair of spaced, parallel transverse carriage plates 146 are attached to and depend from carriage 140. Each plate 146 has two guide rolls 146a and 146b which are disposed for movement within a track 147. Track 147 comprises two transverse parallel bars which extend across frame 52 and are connected to the side plates 53 and 54 thereof. Attached to and depending from track 147 is a stationary plate 148a, and a transverse frame plate 148b connected to the lower end of plate 148a is disposed parallel to track 147 and is connected to the frame side plates 53 and 54. (See FIG. 7.) A similar pair of spaced parallel transverse carriage plates 49 are attached to and depend from carriage 142, and each plate 149 also has two guide rolls 149a and 149b thereon which are disposed for movement within the transverse track 147 on the corresponding transverse frame plate 148a. The inward movement of the pairs of transverse carriage plates 146 and 149 and of carriages 140 and 142, respectively, attached thereto, is effected by means of a hydraulic cylinder 152 having a piston rod 152a axially movable therein. Cylinder 152 is pivotally mounted on a transverse frame member 153 by means of a trunnion bracket 153a. The moving piston rod 152a of cylinder 152 is pivotally connected by means of a pin 154 to a segment gear 155 which is pivotal about a pin 155a. The segment gear 155 intermeshes with a pinion 156 on a shaft 157 which is journalled adjacent its ends in plates 148a and 148b. Also keyed to the ends of shaft 157 are two identical pinions 158 (see FIG. 2), each of which is in engagement with a respective pair of transversely movable racks 159 and 160, best illustrated in FIG. 7. Each rack 159 is disposed above its respective pinion 158 and is attached to the corresponding transverse carriage plate 149, and each rack 160 is disposed below its respective pinion 158 and is attached to the corresponding transverse carriage plate 149.

In the position illustrated in FIG. 7 the carriages are in their normal or fully open position. These carriages are moved inwardly by the axial movement of the piston rod 152a into hydraulic cylinder 152 (to the right in FIG. 7). This movement results in a counterclockwise rotation of gear segment 155 about pivot pin 155a and corresponding clockwise rotation of pinions 156 and 158. The clockwise movement of pinions 158 in turn causes axial movement of racks 159 to the right in FIG. 7 and an equal axial movement of racks 160 to the left. Thus, the carriages which are attached to these racks are moved inwardly toward each other.

The carriages 140 and 142 are moved inwardly until the carton therebetween is centered in the machine. As best illustrated in FIG. 1, an elongate trip bar 161 is disposed slightly inwardly from the surface of carriage 140. This trip bar is connected to a longitudinally disposed rod 162 by means of two connector arms 161a and 161b which extend over carriage 140. Rod 162 is journalled adjacent its ends in brackets 162a and 162b mounted on the outside of carriage 140. A transverse arm 163 is attached to and extends outwardly from rod 162 for engagement with an actuating button on a switch 164.

Another elongate trip bar 165 is similarly provided for carriage 142. This bar is connected to a longitudinally disposed rod 166 by two connector arms 165a and 165b which extend over carriage 142. Rod 166 is journalled in brackets 166a and 166b mounted on the outside of carriage 142, and a transverse arm 167 attached to and extending outwardly from rod 166 engages the actuating button on a second switch 168.

As illustrated in FIG. 27, switches 164 and 168 are connected in parallel between cam-operated switch 143 and solenoid actuated three-way valve 145. Valve 145 is disposed between the main hydraulic line and cylinder 152 and is normally "off," such that cylinder 152 is temporarily disconnected from the hydraulic line. When a voltage is applied to valve 145 through cam actuated switch 143 and at least one of the normally closed switches 164 or 168, the valve will be actuated to permit the hydraulic fluid to flow to and from the cylinder 152 in the direction indicated by the arrows marked A to cause rearward movement of piston rod 152a and counterclockwise movement of segment gear 155. As previously explained this results in inward movement of carriages 140 and 142. This inward movement continues to the end of the stroke of piston rod 152a or until either cam-operated switch 143 is opened, or both switches 164 and 168 are opened by engagement of trip bars 161 and 165 with the carton. Thus, if a carton is present between carriages 140 and 142, these carriages are positioned inwardly in accordance with the width of that carton. Trip arms 161 and 165 are of sufficient length to remain in contact with the carton until switch 143 is opened by cam 143a.

The carriages remain in this position until the carton has been permitted to pass therebetween, whereupon cam-operated switch 144 closes, and valve 145 is actuated in the opposite direction to cause movement of the hydraulic fluid toward and away from cylinder 152, as illustrated by the arrows marked B. At the end of the stroke of piston rod 152a, carriages 140 and 142 are fully open or separated to receive the next carton.

In order to apply glue to the exterior flaps of the carton 50, it is necessary that the previously closed exterior bottom flaps 50c and 50d be opened. Since, however, the carton has been filled, the contents of the carton must be properly supported as these exterior flaps are opened and during the time they remain open for the application of glue thereto. The support for the opened cartons is provided in the form of a package plate 172, best illustrated in FIGS. 1A and 4. This plate 172 has a tapered forward edge 172a and a tapered trailing edge 172b and is disposed in a horizontal plane. This plate is attached to the frame 52 by means of brackets 174 and 175 (see FIG. 3). When the carton 50 is properly positioned on package plate 172, the bottom end flaps 50a and 50b are folded inwardly, and the bottom side or outer flaps 50c and 50d are permitted to swing freely open.

To position the filled carton on the package plate 172, it is necessary that means be provided for initially opening the side flaps 50c and 50d just sufficiently to permit entry therebetween of the tapered forward edge 172a of the package plate. However, during this initial opening, the bottom side flaps must not be opened sufficiently to permit the contents of the carton 50 to drop. The initial opening of the bottom side flaps is accomplished by means of two sets of taper rolls 178 and 179, best illustrated in FIGS. 1 and 4. Taper roll set 178 is mounted on the trailing or exit end of carriage 140, and taper roll set 179 is similarly mounted on the trailing edge of carriage 142. The taper rolls of each set are freely and independently rotatable; and they are properly positioned for each carton because they are mounted on the carriages 140 and 142, the lateral adjustment of which has been described. Each roll presents an angular supporting surface to the exterior bottom flaps of the carton.

As the carton is moved onto rollers 138, carriages 140 and 142 are moved toward each other to center the carton in the machine and to bring the sets for taper rolls 178 and 179 into proper position. As the carton moves from rollers 138 onto taper roll sets 178 and 179, exterior side flaps 50c and 50d are permitted to open slightly. The taper rolls, which have a taper of approximately 15°–20°, permit the bottom end flaps to open sufficiently to permit the entry of the taper end of package plate 172 but do not permit the lower side flaps to open sufficiently to drop the contents of the carton or to permit the end flaps 50a and 50b to drop. The flight bar of the first flight 60 moves the carton onto the forward edge 172a of the package plate 172 with the lower flaps slightly open.

As the carton moves onto the package plate, a lower flap lifter 182 is moved up into engagement with side flaps 50c and 50d and forces these flaps upwardly approximately into the plane of the underside of package plate 172. Thus, in effect, the taper roll sets 178 and 179 permit the opening of the bottom side flaps just sufficiently to permit the forward tip 172a of the package plate to enter therebetween, whereupon the flap lifter 182 substantiall recloses these flaps. Since the tip of the package plate has already entered between the side flaps, the package will be moved smoothly over this package plate, and the plate will enter between the end flaps and the side flaps of the carton. When the carton has been completely moved onto the package plate, the lower flap lifter 182 is moved back to its normal position to permit the downward movement of the flight bar on the first flight between this member and the package plate.

The operation of the flap lifter 182 is best illustrated in FIGS. 10, 11 and 12. This flap lifter is a horizontally disposed plate to which two parallel supporting arms 184 and 185 are pivotally connected. Arm 184 is keyed to a transverse shaft 186 which is journalled in frame 52. Arm 185 is pivotally mounted on stationary shaft 188. Thus, flap lifter plate 182 may be pivotally moved on arms 184 and 185 between the retracted or lowered position illustrated in dotted lines in FIGS. 10 and 11, and the raised position illustrated in solid lines.

Also keyed to shaft 186 is a bell crank lever 190 having an arm 192 and an arm 194. Connected to arm 192 is a flexible shaft 196, the opposite end of which is connected to a bar 198. Bar 198 is pivotally mounted on a pin 200 and carries a follower 202 intermediate pivot pin 200 and the connection with flexible shaft 196. Follower 202 is adapted to operatively contact and ride upon the peripheral surface of cam disk 204 which is keyed to and rotates with shaft 84 (see also FIG. 2B). The exterior conduit 206 for flexible shaft 196 is connected at one end to a frame bracket 208 adjacent flap lifter 182 and at the other end to a similar frame bracket 210 adjacent bar 198. A spring 211 connected between 208 and arm 194 of bell crank 190 urges the bell crank in a clockwise direction and thus urges follower 202 into contact with cam disk 204. In addition, the flap lifter 182 is urged by this spring toward its raised position illustrated in solid lines.

Pivotally mounted on the frame is a latching member 212, best illustrated in FIG. 12. This latching member is urged into its latching position by means of a spring 213. Latching member 212 is adapted to latchingly engage arm 194 of the bell crank 190 to hold the lifter in its retracted position when the bell crank has been rotated to the position illustrated in dotted lines in FIG. 11. This latching member will hold the bell crank in this position, and thus will hold the flap lifter 182 in its retracted position, until a carton is in position for the operation of the lifter. A trip 214 is positioned for engagement by the leading or forward end of the carton, just as this end of the carton has been moved onto the tip 172a of package plate 172. Trip 214 is operatively connected to latching member 212 by means of a flexible cable 216. When trip 214 is engaged by the moving carton, the flexible cable 216 will pivot latching member 212 in the clockwise direction in FIG. 12 to its release position, and bell crank 190 will be permitted to move in a clockwise direction under the influence of spring 211 if the low surface portion 204a is presented to the follower 202. If, for some reason, trip 214 should be actuated at the wrong time, the bell crank 190 would be prevented from moving in a clockwise direction, and flap lifter 182 would be prevented from raising by flexible shaft 196, because during this time the high surface portion 204b would be presented to the follower 202. Thus, flap lifter 182 can move into its raised or operative position only during a proper time in the machine cycle and only when a carton is present to actuate trip 214.

The positioning of trip 214 causes the flap lifter 182 to be raised to reclose the previously opened exterior flaps, just as the forward end of the carton has been moved onto the tapered tip 172a of the package plate. The flaps are thus closed under tip 172a, and as the carton is moved by flight 60 onto plate 172, this plate will enter between the outer flaps and inner flaps and between the outer flaps and the contents of the carton. It will be seen in FIG. 11 that the flap lifter when in its raised or operative position lies in the path of the flight bars of both flights 60 and 62. For this reason, the operation of flap lifter 182 is timed to the flights, and at the proper time it is pulled to its lowered position out of the path of flights 60 and 62.

As previously described when the first flight 60 has delivered the carton into position for engagement by the second flight 62, the carton will momentarily be at rest. The first flight 60 terminates its conveying at idler sprocket 80, best illustrated in FIGS. 1A, 2 and 11, and the flight bars on this first flight just clear the forward end 172a of the package plate 172. The second flight begins its conveying at sprocket 105, and the flight bars mounted thereon also just clear the forward end of package plate 172. Thus, the first flight 60 conveys the carton until the carton is positioned on the forward end of the package plate 172. The interior front and rear bottom flaps 50a and 50b remain folded on the package plate, and the exterior or side flaps of the carton are open and ready for the application of glue thereto.

Extending upwardly from the main portion of frame 52 to form superstructure 55 are vertical channel beams 220, 222, 224 and 226. Side frame member 228 is connected between beams 220 and 222, and side frame member 230 is connected between beams 224 and 226. Extending between these side frame members 228 and 230 is a mounting platform 232 for supporting the various motors and mechanisms for effecting height and width adjustment of the apparatus, as will be hereinafter described. See FIGS. 1A, 2A, 3 and 6.

Mounted between channel beams 220 and 222 at the lower side of the machine is a second side member 234, and mounted between channel beams 224 and 226 is a second side member 236. Extending between second side members 234 and 236 are two parallel transverse members 238 and 240. Mounted for lateral movement between transverse members 238 and 240 are supporting plates 242 and 244. These plates have rollers 246 attached thereto which are disposed within the tracks on transverse members 238 and 240, as illustrated in FIGS. 2A and 5. These supporting plates are laterally movable relative to one another within the tracks of transverse members 238 and 240.

Mounted for vertical movement within the superstructure 55 of frame 52 is a subframe 248 having two parallel side bars 250 and 252 and two cross bars 254 and 256 connected between side bars 250 and 252. Side bars 250 and 252 have four sets of guide rollers 258 mounted thereon for engaging portions of the four respective vertical channel beams of the subframe and for guiding subframe 248 along its vertical travel within the subframe. Cross bars 254 and 256 have horizontal tracks therein, and two supporting plates 260 and 262 having rollers 264 thereon are mounted between these cross bars with the rollers disposed within the tracks. Thus, supporting plates 260 and 262 are relatively movable in a horizontal plane with respect to each other, and these supporting plates are carried by subframe 248 which is movable in the vertical direction toward and away from the lower supporting plates 242 and 244.

A vertical shaft 266 interconnects upper supporting plate 260 to lower supporting plate 242. This shaft extends through these two plates and through a journal bracket 268 in lower plate 242 and a similar journal bracket 270 in upper plate 260. At the lower end of shaft 266 is a pinion portion 272 which engages a rack 274, best illustrated in FIG. 6. At the upper end of shaft 266 is a second pinion portion 276 which is in engagement with a rack 278 mounted between side members 228 and 230. Thus, the horizontal movements of supporting plates 242 and 260 will be identical. Due to the engagement of pinion portions 272 and 276 with stationary racks 274 and 278, respectively, the ends of shaft 266 will move across the superstructure simultaneously and at the same speed, the movement of one supporting plate resulting in corresponding movement of the other supporting plate. A similar shaft 280 extends through journal brackets 282 and 284 on supporting plates 244 and 262, respectively, and a pinion portion 286 at the bottom end of shaft 280 is in engagement with the stationary rack 274 (see FIG. 6). A second pinion portion 288 at the upper end of shaft 280 is in engagement with stationary rack 278 (see FIG. 5), and thus, lateral movement of supporting plates 244 and 266 is effected simultaneously with lateral motion of shaft 280, and the ends of shaft 280 as well as plates 244 and 262 are maintained in vertical registration and alignment by virtue of the engagement of the pinion portions of these shafts with the stationary racks as previously described. As the shafts 266 and 280 are moved toward and away from each other, they will carry with them supporting plates 242 and 260, and 244 and 266, respectively. The supporting plates will be moved at a uniform and equal speed, and as the shafts 266 and 280 are moved they will rotate due to their engagements with racks 274 and 278.

For lateral movement of shafts 266 and 280 two parallel, horizontally movable racks 290 and 292 are provided, as illustrated in FIGS. 1A, 2A and 3. Attached to rack 290 is a bracket 294 in which the end of shaft 280 is journalled. Attached to the end of rack 292 is a bracket 296 in which the upper end of shaft 266 is journalled. A pinion 298 is disposed between racks 290 and 292. Rotation of this pinion will result in corresponding movement of racks 290 and 292 toward and away from each other depending upon the direction in which the pinion is rotated. If the pinion 298 is rotated in the clockwise direction, as illustrated in FIG. 1A, this will result in movement of rack 290 toward side frame member 228 and corresponding movement of rack 292 in the opposite direction toward side frame member 230. This movement of the racks will cause corresponding movement of shafts 266 and 280 away from each other and thus the supporting plates will move away from each other. Rotation of the pinion 298 in the opposite direction will result in the movement of the supporting plates toward each other. Rotation of pinion 298 is accomplished by means of a fluid motor 300 acting through a transmission gear box 302.

Movement of the subframe 248 in the vertical direction is accomplished by fluid motor 304 which by means of a belt 305 drives a cross shaft 306 having reduction gear boxes 308 and 310 connected at either end (see FIG. 1A). Two parallel shafts 312 and 314 are driven by reduction gears 308 and 310, respectively. Shaft 312 is journalled in two frame brackets 316 and 316a, and shaft 314 is journalled in similar frame brackets 318 and 318a. A pinion 320 is connected to one end of shaft 312 and is in engagement with rack 322 which is connected to subframe 248. On the opposite end of shaft 312 is a pinion 324 which is in engagement with a rack 326 also attached to subframe 248. In like manner a pinion 328 on the end of shaft 314 engages a rack 330 attached to subframe 248, and on the opposite end of shaft 314 is another pinion 331 in engagement with a rack 332 also attached to the subframe 248. It will be apparent that the rotation of shafts 312 and 314 will, by virtue of this rack and pinion arrangement, cause vertical movement of subframe 248, the direction of movement depending upon the direction of rotation of shafts 312 and 314 and of motor 304.

A large horizontally disposed coil spring 333 is attached at one end to side frame member 230, and a flexible cable 333a extends between the other end of spring 333 and side bar 250 of the subframe over an idler wheel 333b. A second large horizontally disposed coil spring 334 is attached at one end to side frame member 228, and a flexible cable 334a extends between the other end of this spring and side bar 252 over an idler wheel 334b. These springs 333 and 334 counterbalance the weight of subframe 248 so that the vertical adjustments thereof may be made by fluid motor 300. Two limit switches 335 and 335a are effective to stop the operation of height adjust motor 304 when the subframe 248 has reached the limits of its range of vertical adjustments.

Mounted on each of the supporting plates 242, 244, 260 and 262 is an independent mechanism for applying glue to the side flap of the carton as the carton is moved through the machine. Various guides are also provided on these supporting plates, and at the trailing end of each supporting plate is provided a means for folding the exterior flaps closed. The mechanisms for applying glue and folding the exterior flaps will be hereinafter described in further detail.

One of the features of this invention is the provision of means for detecting the height and width of the carton and for effecting the height and width adjustments of the machine accordingly, so that glue may be applied to the side flaps in the proper manner, and the side flaps may be again folded to seal the carton. The means for determining the width of the carton is best illustrated in FIGS. 1, 1A, 8 and 9 and is illustrated in schematic in FIG. 28. For this purpose one end of a longitudinally disposed laterally movable width bar 336 is pivotally connected to a forward width arm 340, and width arm 340 is keyed to the upper end of a vertical shaft 342 which is pivotally mounted on frame side plate 53. The opposite end of width bar 336 is pivotally connected to a trailing arm 344 which is parallel to arm 340, and the opposite end of which is keyed to a shaft 346 parallel to shaft 342 on frame side plate 53. A second longitudinally disposed laterally movable width bar 338 in a similar manner has a forward arm 348 pivotally connected at one end and a trailing arm 350 parallel to arm 348 pivotally connected at the opposite end. Arm 348 is keyed to the upper end of a vertical shaft 352 pivotally mounted on frame side plate 54, and arm 350 is keyed to a second vertical shaft 354 also pivotally mounted on side frame plate 54. A lever arm 356 is keyed to the lower end of shaft 342, and a similar lever arm 358 is keyed to the lower end of shaft 352. A transverse link 360 pivotally connects lever arm 356 and lever arm 358 below frame 52. Thus, package contacting bars 336 and 338 are operatively interconnected, such that the transverse movement of one of the longitudinal width bars 336 or 338 will result in a corresponding and identical transverse movement of the other of these width bars.

The pivotal parallel arm connection of the width bars to the sides of frame 52 assures that these bars will remain longitudinally oriented in parallel with respect to one another. In FIGS. 1 and 1A the width bars 336 and 338 are illustrated in their normal position adjacent one another. In this position the spacing between these bars is minimum and is slightly less than the width of the smallest carton which is adapted to be sealed in the machine. Attached to arm 348 is a finger 362 which when bars 336 and 338 are in their normal position engages a switch 364 mounted on frame side plate 54. This finger 362 not only operates the switch in this manner, but the engagement of this finger with the switch prevents the further movement of finger 362 and of width arm 348.

Since the further movement of one of the width arms is prevented, the further inward movement of width bars 336 and 338 is also prevented due to their operative interconnection. When the carton is advanced into contact with width arms 340 and 348 by the first flight 60, bars 336 and 338 are forced apart until the distance therebetween is sufficient to permit the passage of the carton, and they remain in that position until the carton has passed therethrough. The distance which bars 336 and 338 must separate to permit passage of the carton is indicative of the width of the carton, and this indication controls the operation of width adjust motor 300.

Keyed to shaft 346 is a sprocket 366 having a chain 368 thereabout (see FIGS. 8 and 9). Chain 368 extends over a spring biased idler sprocket 369 and about a sprocket 370. Sprocket 370 is keyed to a shaft 372 pivotally mounted on the frame side plate 53 by means of brackets 374 and 376. Also keyed to shaft 372 is a cam disk 378 having a high surface portion 378a, a low surface portion 378b and an intermediate surface portion 378c sloping between the high and low surface portions. It may be seen that the position of the cam disk 378 is determined by the position of the width arm 344.

Mounted about the shaft 372 for free pivotal movement is a sleeve 380 having a sprocket 382 attached to the upper end and a fixture 384 attached to the lower end. A chain 386 extends about sprocket 382 over a spring biased idler sprocket 387 and about a sprocket 388. Sprocket 388 is keyed to a shaft 390 pivotally mounted on frame side plate 53 by means of a bracket 392. Keyed to shaft 390 and pivotally movable therewith is an elongated arm 394 on the opposite end of which is a pin 394a which is disposed within a longitudinal slot 395 in a horizontal brace 396 of a structure 397 on supporting plate 242.

Thus, as supporting plate 242 with the structure 397 thereon is moved laterally, arm 394 will pivot with shaft 390, and pin 394a will move to the left in slot 395. Rotation of shaft 390 will result in rotation of sprocket 388 and corresponding rotation of sleeve 380 to which sprocket 382 and fixture 384 are connected. Pivotally mounted at the end of fixture 384 by means of a horizontal pin 398 and pivotally movable with fixture 384 about the vertical axis of shaft 372 is a bell crank lever 399, one arm of which is connected by swivel connection 400 to a flexible shaft 402, and the other arm of which carries a follower 404 in engagement with cam disk 378. The exterior conduit 406 for cable 402 has one end connected to a bracket 408, and the opposite end is connected to a bracket 410. Brackets 408 and 410 are both mounted on the frame side plate 53.

The opposite end of flexible shaft 402 is connected to a three-way hydraulic valve 412. This valve is in communication with fluid motor 300 which effects lateral adjustment of supports 242, 244, 260 and 262 as previously described. Valve 412 has three positions. When the control valve 412a is in one of these positions, fluid is permitted to move through valve 412 to fluid motor 300 to cause operation of motor 300 in one direction. When the control lever 412a of the valve is in one of the other positions the valve is effective to permit fluid flow to motor 300 to cause operation of this motor in the opposite direction. When control lever 412 is in the third or intermediate position valve 412 is off, and there is no fluid flow to motor 300.

The position of control lever 412a of the valve is determined by the position of bell crank 399 which in turn is determined by one of the three cam surface portions 378a, 378b or 378c which is in contact with follower 404. It may be seen that as the carton moves between the width bars 336 and 338, cam disk 378 will be rotated to a position corresponding to the width of the carton. This cam disk will present a surface portion to follower 404 which will in turn cause movement of valve control lever 412a of valve 412 into the position which will cause operation of width adjust motor 300 in the proper direction. Width adjust motor 300 operates to effect lateral adjustment of the supports resulting in corresponding rotation of fixture 384 and the bell crank lever 399 pivotally connected thereto. This width adjustment will continue until the follower 404 on bell crank 399 has moved circumferentially about the positioned cam disk 378 to engage intermediate surface 378c. At this point the lever 399 will be pivoted about horizontal pin 398, and the valve control lever 412a will be moved to its intermediate or off position.

As illustrated in FIG. 28, intermediate the main hydraulic line and the three-way valve 412 is a solenoid actuated two-way on-off valve 413. This valve is normally "off" or closed, disconnecting valve 412 from the hydraulic line. When a voltage is applied to valve 413, the valve is opened or "on" to again place valve 412 in operation. Voltage is applied to valve 413 through normally closed switch 364 and a switch 414 operated by a cam 414a within electrical camming mechanism 92, both switches being in series. Switch 364 as previously described is engaged by a finger 362 on width arm 348 when there is no case between the width bars and arms. Finger 362 thus opens this normally closed switch if there is no case present, and valve 413 is thereby closed preventing operation of width motor 300. Switch 414 is opened by cam 414a only during a short interval in the machine cycle in order to prevent premature width adjustment, i.e., adjustment before the preceding carton has left the machine.

The height-sensing operation is accomplished electrically. As previously indicated, the apparatus constructed in accordance with this invention is adapted to seal regular slotted corrugated cartons, in which the flaps are each equal to one half the width of the carton. Inasmuch as the cartons are delivered to the machine most conveniently with the top flaps open and substantially erect, the height-sensing means is adapted to determine the position of the extremity of these top flaps. Since the height of each of these flaps is one half the width of the carton, means is also provided for compensating for this flap height, so that the height adjustment of the machine is actually made in accordance with the height of the closed carton.

In order to accomplish this, side plates 414 and 416 are connected to racks 322 and 330 on subframe 248, as best illustrated in FIG. 6. Pivotally connected to plate 414 are two radius arms 418 and 420, the opposite ends of which are operatively connected to a mounting bracket 424. In like manner two parallel arms 424 and 426 are pivotally connected between plate 416 and a second mounting bracket 428.

For the height-sensing operation two photoelectric units are employed, each unit including a light source and a photoelectric cell (see FIGS. 1A, 2A, 4 and 6). A light source 430 of the first of the units is mounted on mounting bracket 422 together with the photoelectric cell 432 of the second of the photoelectric units. Mounted on bracket 428 is the photoelectric cell 434 for the first photoelectric unit and the light source 436 of the second photoelectric unit. The light source 430 and the photoelectric cell 434 of the first unit are horizontally aligned. The light source 436 and the photoelectric cell 432 of the second unit are also horizontally aligned, but these parts are mounted slightly above the parts of the first photoelectric unit.

The operation of the photoelectric units is best illustrated in FIGS. 29 and 30. The photoelectric cell 434 is sensitive to light from source 430, and upon receipt of light from this source this cell is effective to transmit a voltage to a solenoid 438a which is effective to close the normally open switch 438 operating a valve 440 which controls the height adjust motor 304. When solenoid switch 438 is closed, a voltage will be applied to the valve 440 to cause operation of motor 304 in a direction resulting in downward movement of subframe 248. Photoelectric cell 432 of the second unit, which is mounted slightly above the first photoelectric unit, is effective to actuate a solenoid 442a to open the normally closed switch 442 when light is received from source 436. Solenoid switch 442 is also connected to valve 440 and controls the operation of this valve in such a way that when this switch is closed, the valve 440 will cause operation of fluid motor 304 in a direction which will result in upward movement of subframe 248. The switch 442 is, therefore, returned to its normally closed position when light between source 436 and cell 432 is interrupted.

Voltage to valve operating switches 438 and 442 is applied from a 110 volt source through "no carton" switch 364 and a switch 443. Switch 443 is operated by a cam 443a within electrical camming mechanism 92, and this switch is opened by cam 443a during a short interval in the machine cycle to prevent premature height adjustment, i.e., height adjustment before the preceding carton has left the machine. As previously described in connection with the width-sensing and adjusting mechanisms, switch 364 is normally closed but is opened by finger 362 when there is no carton between the width arms and bars. Thus, when there is no carton in position for height and width sensing, switch 364 will prevent both height and width adjustments of the machine.

Adjustments are made at the proper time in the machine cycle and when a carton is in proper position for dimension sensing. If at this time the subframe was in a raised position because of the adjustment for the preceding carton, both photoelectric units may be above the edge of the flaps of the carton now being sensed as illustrated in FIG. 29. Since light is received by both cells 432 and 434, switch 442 will be open, and switch 438 will be closed. Height adjust fluid motor 304 will, therefore, be operated by valve 440 to effect downward movement of the subframe 248 to which the photoelectric units are attached. Motor 304 will continue to operate and the downward movement will continue until the subframe is lowered to position photoelectric cell 434 below the flap extremity at which point the light to cell 434 will be interrupted, and switch 438 will return to its normal "open" position permitting valve 440 to return to its normal "off" position thereby stopping motor 304.

It is readily apparent that if the adjustment for the previous carton had been too low for the carton now being sensed, light to both cells 432 and 434 would have been interrupted. Switch 442 would thus be closed, and valve 440 would operate motor 304 in a direction to effect upward movement of subframe 248 until the position of FIG. 30 is reached to open switch 442 and turn off the hydraulic flow to fluid motor 304.

In order to maintain the horizontal alignment between the light source and photoelectric cell of each unit, radius arms 418 and 424 are interconnected by means of a transverse shaft 444, best illustrated in FIGS. 1A and 6. This shaft actually forms one of the pivotal connections for arms 418 and 424 in side plates 414 and 416, respectively. This connection causes equal and simultaneous pivotal movement of each of the four radius bars and maintains the horizontal alignment of the two photoelectric units. The radius bar arrangement permits the vertical adjustment of brackets 422 and 428 with respect to subframe 248 and insures that the photoelectric units will maintain their exact horizontal and vertical orientation throughout their entire range of adjustment with respect to subframe 248.

A flexible cable 446 is connected between radius bar 420 and width arm 340 of the width-sensing device, as best illustrated in FIGS. 1 and 1A. One end of the conduit 448 for this cable is connected to frame side plate 53 by means of a bracket 450, and the other end thereof is connected to the side plate 414 of the subframe by means of a bracket 452. Another flexible cable 454 is connected between radius bar 426 and width arm 348 of the width-sensing means on the opposite side of the machine. The conduit 455 for this flexible cable is connected to frame side plate 54 by means of a bracket 456 and to the side plate 416 of the subframe by means of a bracket 458. Cables 446 and 454 thus interconnect the height-sensing means with the width-sensing means, and a movement of width bars 336 and 338 with respect to the frame 52 will result in corresponding height adjustment of brackets 422 and 428 with respect to subframe 248.

The displacement of width bars 336 and 338 from the longitudinal center line of the machine will be directly transmitted through cables 446 and 454 to the radius bars and mounting brackets upon which the photoelectric units are mounted. The amount of vertical adjustment of the photoelectric units will be equal to one half the width of the carton being sensed. As previously described, the height of the carton flaps also equals to one half the carton width, and therefore, the height of the carton flaps is actually subtracted before the height sensing by the photoelectric units takes place. Therefore, when the subframe 248 is positioned by the vertically adjustable photoelectric units, it will be positioned in accordance with the carton height only and will not be affected by the carton width or the flap height.

For example, if two cartons of the same height but of different widths are successively sensed by the height and width-sensing mechanisms, there will be no vertical adjustment of subframe 248 even though the flap heights of the two opened cartons may widely differ. This is because the flap height has already been subtracted or compensated by the vertical adjustment of the photoelectric units with respect to the subframe 248. The difference in the flap heights of the two cartons will, however, cause greater automatic vertical adjustment of the photoelectric units for the wider case than for the narrower case.

The weight of arms 418, 420, 424 and 426 together with the weight of the mounting brackets and the photoelectric units operates through cables 446 and 454 to urge width arms 340 and 348 and width bars 336 and 338 toward their normal or closed position illustrated in FIGS. 1 and 1A. In order to insure that the carton contacting bars 336 and 338 are fully urged into their normal position, an additional weight 460 is provided. This weight is connected to transverse shaft 442 by means of an arm 462 and a sleeve 464.

The height and width adjustments of the machine are made during the time the carton is at rest on the forward end of the package plate 172 and before the next bar on flight 62 comes into engagement therewith. After the height and width adjustments have been made, the carton is advanced by flight 62 through the remaining portions of the machine for the application of glue to and the subsequent closing of each of the four exterior flaps of the carton.

In order to avoid interference with the gluing and closing of the exterior flaps, it is desirable to have the inner flaps fully closed during these operations. As previously described, the carton is delivered to the package plate 172 with the bottom inner flaps closed. Means is, therefore, provided for closing the front and rear top flaps of the carton. The front flap closer 466 is an elongate longitudinally disposed bar which is centrally fixed to and depends from subframe 248 as illustrated in FIGS. 3, 5, 20 and 21. The forward end 468 of this upper front flap closer is curved upwardly, and the front flap of the carton is merely pushed closed as the carton is moved into engagement with this structure. The flap closer 466 is simultaneously positioned with the subframe 248 to which it is attached. The flap closer maintains the front flap in its closed position as glue is applied to the exterior flaps, and when the rear flap approaches this structure it is folded downwardly, as will be hereinafter described, so that it too may move in the folded condition under flap closer 466. The flap closer 466, thus maintains both the front and the rear end flaps in the closed position during the period when glue is applied to the side flaps of the carton.

Glue is applied to the side flaps of the carton by means of four glue roll assemblies 470, 472, 474 and 476. The glue roll assemblies 470 and 472 apply glue to the upper flaps of the container and are substantially identical in construction. Roll assembly 470 is illustrated in detail in FIGS. 13, 14, 15 and 16. Included in roll assembly 470 is a glue roll 478, the surface of which is horizontally grooved and undulated. Glue is applied to roll 478 by means of a conduit 480. Roll 478 has a central shaft 481, the upper end of which is journalled in and extends through a plate 482, and a vertical plate 484 is attached to plate 482 and extends downwardly therefrom. The lower end of shaft 481 extends into housing 486 which is attached to and extends transversely outwardly from vertical plate 484.

Attached to vertical plate 484 and extending into contact with the surface of roll 478 is a blade 488. This blade is disposed at an angle with respect to the surface of roll 478, and in effect wipes this surface, so that glue applied to the roll through conduit 480 is spread over the surface of the roll. The excess glue is led by wiper blade 488 into an aperture 490 in housing 486, best illustrated in FIG. 16. Journalled within housing 486 are two smooth-faced wheels 492 and 494. The interior of housing 486 is contoured such that the surface of each of the wheels 492 and 494 is in close proximity therewith, and these wheels are mounted in very close proximity with each other. Wheel 492 has a thin pinion portion 492a which is in engagement with a corresponding thin pinion portion 494a on the bottom of wheel 494. Thus, these wheels rotate in unison in opposite directions.

The lower end of shaft 481 is connected to wheel 492. Roll 478 is adapted to rotate in a counterclockwise direction causing clockwise rotation of wheel 492 and clockwise rotation of wheel 494. As the glue is conducted by wiper blade 488 into aperture 490, it contacts the smooth surface of wheels 492 and 494 and is carried by these smooth surfaces through the restriction between the sides of housing 486 and the peripheral surface of the wheels. This glue is thus pumped into a space on the opposite side of wheels 492 and 494 which is in communication with a glue returned duct 496.

Attached to vertical plate 484 is a curved guide plate 498 which is adapted to guide the carton flap into position for the application of glue thereto by roll 478. Attached to vertical plate 482 is a block 500 which has a stub shaft 502 extending upwardly therefrom. A hook-like slot 503 is provided adjacent the upper end of stub shaft 502. Pivotally connected to vertical plate 484 by means of a pin 504 is a bolt 506 and welded to horizontal plate 482 is a spacer block 508 having a stub shaft 510 extending upwardly therefrom. The end of stub shaft 510 is also slotted. Holes 512 and 514 are provided in supporting plate 262 for the accommodation of stub shafts 502 and 510, respectively, and a slot 516 in the edge of supporting plate 262 accommodates swing bolt 506.

In order to secure the glue roll assembly 470 in position on supporting plate 262, two clamps 518 and 520 are provided. Clamp 518 comprises a plate 522 having an open-end slot 524 and a closed-end slot 526. Intermediate slot 524 and 526 is a central slot 528, having clamping lever 532 mounted therein by means of a pin 530, and a pin 534 traverses slot 526. Clamp 520 comprises a plate 536 having an elongated central slot 538 traversed by a pin 540 and an end slot 542 within which a clamping lever 544 is pivotally mounted by means of a pin 546. Clamping lever 544 is substantially identical in shape to clamping lever 532, both having a camming surface to provide a very tight clamp on plate 262.

In order to clamp the front side of the glue roll assembly to plate 262, plate 522 of clamp 518 is placed in position with stub shaft 502 within elongated slot 526. Plate 522 is then moved outwardly (downwardly in FIG. 15) until pin 534 traversing slot 526 is engaged within the slot 503 in the end of stub shaft 502. Swing bolt 506 is then pivoted upwardly to the position illustrated in FIGS. 13, 14 and 15 within slot 524 of plate 522. Clamping lever 532 is then brought to its lowered or clamping position, as illustrated, clamping the forward end of glue roll assembly 470 in position on plate 262. Clamp 520 is attached to stub shaft 510 by placing this plate over the end of this stub shaft, so that slot 538 will accommodate the stub shaft. The plate is then moved outwardly (downwardly in FIG. 15) until the pin 540 is engaged in the slot in the end of stub shaft 510. At this point the clamping lever 544 is lowered to its clamping position, and the plate 262 is thus tightened on stub shaft 510. The entire assembly may quite easily be connected and disconnected from the supporting plate.

The structure of the lower glue roll assemblies 474 and 476 is somewhat similar to the construction of the upper glue roll assemblies. The structure of assembly 474 is illustrated in detail in FIGS. 17, 18 and 19. This assembly includes a grooved and undulated glue roll 548 having a central shaft 550 extending therethrough. The upper end of shaft 550 is journalled in a horizontal plate 552, and a vertical plate 554 is attached to and depends from plate 552. A housing 556 is attached to the lower end of vertical plate 554, and three pins 558, 559 and 560 extend downwardly from housing 556. Journalled within housing 556 are two smooth-faced wheels 562 and 564 corresponding to the smooth-faced wheels 492 and 494 of roll assembly 470.

The lower end of shaft 550 is connected to and extends through wheel 562 and housing 556, and rotation of this shaft will cause rotation of both roll 548 and wheel 562. Wheel 562 has a thin pinion portion 562a adjacent its lower end, and wheel 564 has a thin pinion portion 564a adjacent its lower end. The pinion portions of these two rolls are interengaged, and the interior walls of housing 566 are contoured and are in close proximity with the surfaces of rolls 562 and 564. Glue is delivered to roll 548 by means of a conduit 566, and this glue is spread over the surface of the roll, the excess being conducted away by means of a wiper blade 568 attached to vertical plate 554. Blade 568 is mounted above an aperture 570 in housing 556, and the excess glue from roll 548 is conducted by this plate into this aperture. In the housing the smooth faces of rolls 562 and 564 carry the glue through the restrictions between these rolls and the interior surface of the housing to an area on the opposite side of the rolls which is in communication with a glue return duct 572.

In order to clamp the lower glue roll assembly 474 in position on lower supporting plate 244, two clamps 574 and 576 are provided. Clamp 574 includes a finger member 578 having threaded pivot pin 580 extending therethrough, the end of which is threaded into supporting plate 244. One end of finger member 578 is in engagement with a portion of housing 556, and the other end of this finger member is bifurcated to accommodate a clamping lever 582 which is pivotally connected therein by means of a pin 584. A coil spring 586 acts between finger member 578 and plate 244 to maintain the finger member in proper position. A slotted block 588 mounted on supporting plate 244 is adapted to be engaged by clamping lever 582, as illustrated in FIG. 17.

Welded to the forward end of supporting plate 244 is a bracket 590 to which clamp 576 is pivotally attached. Clamp 576 includes a swing bolt 592 pivotally connected to bracket 590 by means of a pin 594. A clamping lever 596 is pivotally attached to the opposite end of swing bolt 592 by means of a pin 598. This clamping lever is adapted to engage a slotted block 600 attached to housing 556.

Glue roll assembly 474 is thus attached to supporting plate 244 by inserting pins 558, 559 and 560 into their proper holes in the supporting plate. The finger member 578 at this time is in position approximately 90° to that illustrated in FIG. 17, that is, it is swung to one side on threaded pin 580, and swing bolt 592 is in its lowered position (not shown). After the pins have been placed in their respective holes in the supporting plate 244, finger member 578 is swung to the position shown, into engagement with a portion of housing 556, and clamping lever 582 is swung from the vertical position into the horizontal position camming against slotted block 588. The slot in block 588 prevents any subsequent pivotal movement of finger 578 about threaded pin 580. Swing bolt 592 is then pivoted upwardly to the position illustrated in FIG. 17 into the slot in block 600, and clamping lever 596 is pivoted vertically downward to the illustrated vertical position from a horizontal position camming against block 600. Thus, the glue roll assembly is tightly clamped in position on the supporting plate.

The glue rolls are operated individually by variable speed D.C. motors. As illustrated in FIG. 3, motor 602 drives glue roll assembly 470; motor 604 drives glue roll assembly 472; motor 606 drives glue roll assembly 474; and motor 608 drives glue roll assembly 476. Motor 606 drives a wheel 610 through a shaft 612 and a right angle transmission 614, best illustrated in FIGS. 2A and 4. A timing belt 616 extends about wheel 610 and about a drive wheel 618 (see FIG. 24). Drive wheel 618 has a shaft 620 which extends into a housing 622, and a pinion 624 within housing 622 is attached thereto. Pinion 624 is in working engagement with a larger pinion 626 also journalled within housing 622. Pinion 626 is mounted on a sleeve 628 having a square hole 630 broached therethrough which is adapted to accommodate the squared end 550a of glue roll shaft 550. The housing 622 extends upwardly through a hole in plate 244, as best illustrated in FIGS. 17 and 24. Thus, motor 606 rotates wheel 618, and this motion is transmitted to shaft 550 of glue roll 548. Each of the glue rolls is operated in a similar manner.

If the length of the carton to be sealed is greater than the width, it is very desirable to provide a means for applying glue only to the portions of the side or exterior flaps which overlap the end or inner flaps, and to skip the portion of the side flaps intermediate the end flaps. In order for glue to be applied to the side flaps, backing rolls are provided. As best illustrated in FIG. 3, backing roll 632 cooperates with glue roll assembly 470; backing roll 634 cooperates with glue roll assembly 472; backing roll 636 cooperates with glue roll assembly 474; and backing roll 638 cooperates with glue roll assembly 476. The operation of the backing rolls is best illustrated in FIGS. 20 and 21.

Each of the backing rolls is mounted on a bell crank lever 640, one arm of which is pivotally connected to the respective supporting plate by means of a pin 642. The other arm of bell crank 640 is pivotally connected to rod 644 which is axially movable with respect to the supporting plate by means of a solenoid 646. The bell crank lever is urged toward its normal position illustrated in FIGS. 20 and 21 by means of a spring 648. When solenoid 646 is energized, bell crank lever 640 is pivoted about pin 642 in a counterclockwise direction in the case of backing rolls 632 and 636, and in a clockwise direction in the case of backing rolls 634 and 638. Thus, when solenoid 646 is energized, the backing roll is moved away from the glue roll against the resistance of spring 648. When solenoid 646 is de-energized, spring 648 effects the return of the glue roll to its normal glue-applying position. Since it is desirable to apply glue only to the overlapping portions of the side flaps, the beginning and end of the glue skip is governed by the width of the carton.

The mechanism for starting the glue skip is illustrated in FIGS. 22 and 23. This mechanism includes a shaft 650 having a pinion portion 652 in engagement with rack 274. Shaft 650 is journalled in supporting plate 244 and is also journalled in a bracket 654 attached to a horizontal brace 656 extending between vertical members 658 and 660 of a structure 662 on supporting plate 244. A pinion portion 664 at the top end of shaft 650 engages a movable rack 666 that moves longitudinally with respect to the machine frame 52 in a guideway 667 which is attached to horizontal brace 656 of structure 662. Also extending between members 658 and 660 and journalled in these members is a square shaft 668. One end of square shaft 668 extends through member 658, and a switch-actuating finger 670 is attached thereto. Switch-actuating finger 670 is in engagement with a control button 672 on switch 674. A spring 676 urges square shaft 668 in a direction which will maintain finger 670 in contact with button 672. Mounted for axial movement on square shaft 668 is a sliding fixture 678 having trip finger 680 extending therefrom into the path of the carton over a longitudinal carton guide 682 which is mounted on the upper end of members 658 and 660 of structure 662. Integral with sliding fixture 678 and extending downwardly therefrom is a leg 684 disposed between two guide blocks 686 and 688 which are affixed to sliding rack 666. It may be seen that as shaft 280 is moved transversely outward (to the left in FIG. 23) carrying with it supporting plate 244, shaft 650, which has a pinion portion 652 in engagement with stationary rack 274, will rotate in a clockwise direction as viewed from the top. Pinion portion 656 will also rotate in this same direction causing movement of sliding rack 658 to the right (in FIG. 22) carrying with it fixture 678 which is slidably movable on square shaft 668. Thus, the trip finger 680 will be moved to the right away from the glue rolls when the shafts 266 and 280 are moved apart, that is, when the supporting plates are separated for a wider case; and conversely when the shafts 266 and 280 are moved toward each other to move the supporting plates inwardly toward each other, the trip finger 680 will be moved to the left in FIG. 22 toward the center line of the glue rolls. Thus, the wider the case, the later the glue skip is started, because the end flaps are wider and less distance is skipped. As the case is advanced into contact with trip 680, the fixture 678 is pivoted resulting in a corresponding rotation of shaft 668 and of switch-actuating finger 670 causing actuation of switch 674. Switch 674 is connected to the four solenoids 646, and when this switch is closed these solenoids are energized to pivot backup rolls 632, 634, 636 and 638 away from their respective glue rolls to discontinue the application of glue to the carton flaps therebetween.

Figure 26:
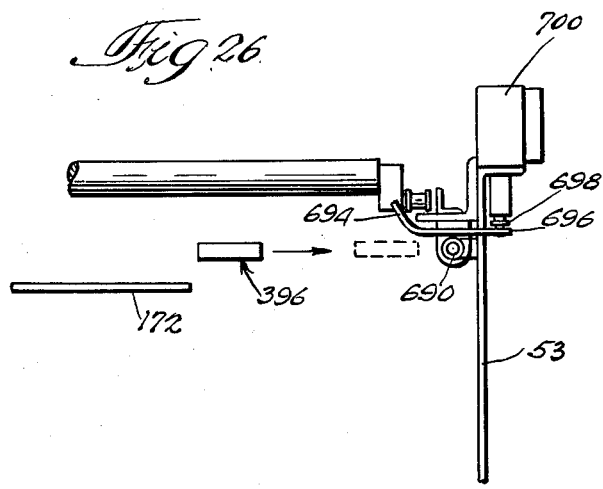
FIG. 26 is an end elevation view of the glue skip terminating mechanism illustrated in FIG. 25 and taken substantially along line 26—26 of that figure.

The means for terminating the glue skip is best illustrated in FIGS. 25 and 26. Mounted horizontally on frame side plate 54 is a rod 690 upon which a trip 692 is mounted for slidable movement. Trip 692 has an elongate inwardly disposed flange plate 694 which is positioned in the path of the flight bars on flight 62 and an elongate outwardly disposed flange plate 696, which is in engagement with an actuating button 698 on a switch 700. A flexible chain 702 is connected between trip 692 and the structure 396 on supporting plate 242 over an idler sprocket 704. A spring 706 urges trip 692 to the right in FIG. 25 toward the carton receiving end of the machine and toward the oncoming flight bar which engages it. Since the beginning of the glue skip is actuated by the forward end of the carton-engaging trip 680 in the mechanisms illustrated in FIGS. 22 and 23, the end of the glue skip is actuated by the flight bar which is at the trailing end of the carton, when this carton conveying flight bar engages trip 692. It is apparent that the wider the carton, the closer structure 396 will be to the side frame plate 53; and the farther the forward end 694a of flange 694 will be from the center line of the glue rolls. The glue skip is terminated sooner for the wider cartons, because these cartons have wider inner flaps; and there is, therefore, less skip distance. When a carton of equal length and width is received, there will be no glue skip, because the start trip 680 and the stop trip 692 will be engaged simultaneously.

The operation of the glue skip mechanisms is best illustrated in FIGS. 31, 32, 33 and 34. The circuit to solenoid 646 is through a timing switch 708, the normally closed skip stop switch 700 and the normally open skip start switch 674. Switch 708 is operated by a cam 708a within electrical camming mechanism 92. In FIG. 31 the carton 50 is just entering the glue rolls. The backup roll 632 is in proper position for the application of glue by roll 478, being urged into this position by means of the spring 648. In FIG. 32 glue has been applied to a portion of the side flap of carton 50, and the forward edge of carton 50 has come to engagement with the trip 680 associated with switch 674 of the glue skip start mechanism. This closes the circuit to solenoid 646 through the cam-operated switch 708 and the glue skip stop switch 700. Solenoid 646 is thus actuated to pull backup roll 632 away from the side flap of carton 50, and thus glue roll 478 will not be effective to apply glue to the inner surface of that flap. In FIG. 33 the flight bar on flight 62 which is conveying carton 50 through the machine has engaged trip 692 associated with the normally closed switch 700. This opens the circuit, and spring 648 will then be effective to return backup roll 632 to its operative position wherein glue roll 478 will again be effective to apply glue to the inner surface of the carton flap. The length of the tripping flange 694 on trip 692 insures that regardless of the position of the trip, the flight bar on flight 62 will remain in contact therewith to keep switch 700 open until the cam disk 708a causes switch 708 to open. As illustrated in FIG. 34 switch 708 operated by cam disk 708a prevents the operation of the glue skip until the next carton is brought into position to engage trip 680 of the glue skip start mechanism.

As previously indicated, the front flap closer 466 affixed to subframe 248 effects the closing of the front top flap of the carton when the carton is moved into engagement therewith. Means is therefore provided for closing the rear top flap of the carton, so that this flap may enter under arm 466 in the closed position. The timing of the closing of the rear flap will depend upon the length of the rear flap, which as previously indicated is equal to one half the width of the carton. Thus, in effect, the timing of the rear flap-closing mechanism is governed by the width of the carton.

The rear flap-closing arm 710 is pivotally mounted on the subframe 248 by means of a transverse shaft 712 which extends between a side plate 416 and a housing 714 mounted on side plate 414, as best illustrated in FIGS. 1A and 2A. On the end of shaft 712 within housing 714 is a pinion 716 in engagement with two parallel racks 718 and 720 which are actually two pistons within hydraulic cylinders 722 and 724, respectively, as best illustrated schematically in FIG. 35. When the racks 718 and 720 are moved in the direction of the arrows the rear flap tucker 710 is rotated with shaft 712 into its operative tucking position which is approximately 90° with respect to the normal or retracted position illustrated in FIG. 2A.

The operation of hydraulic cylinders 722 and 724 is accomplished by means of a valve 726, which in its normal position permits fluid to flow into cylinders 722 and 724 in a direction which will cause movement of racks opposite to that indicated by the arrows and will cause upward movement of tucking arm 710 into the retracted position illustrated in FIG. 2A. When current is applied to actuate the solenoid within hydraulic valve 726, the flow of fluid to cylinders 722 and 724 is reversed moving racks 718 and 720 in the direction of arrows and moving tucking arm 710 downwardly into engagement with the rear flap of the carton. The actuation of the solenoid in valve 726 is effected in the cycle of the machine by a switch 728 operated by a cam disk 728a within the electric camming mechanism 92. As previously indicated, however, the longer the carton flaps, the sooner the rear flap must be tucked to pass under the front flap closer 466; and if the carton is wide and the flaps are long, means must be provided to close a second switch 730 connected across switch 728 in order to actuate the solenoid in valve 726 in advance of the closing of switch 728 by cam disk 728a.

The mechanism for closing switch 730 is best illustrated in FIGS. 2A and 3. Mounted on one side of the frame 52 by means of a bracket 734 is an elongate arm 736 extending transversely across the frame. Attached to and vertically depending from supporting plate 244 is a fixture 738 having a track 740 therein. Track 740 is disposed at approximately a 30° angle with respect to the horizontal, and a follower roller 742 mounted on the end of arm 736 is adapted to ride within angularly disposed track 740 as supporting plate 244 is moved laterally toward and away from the center of the machine during width adjustment. Mounted on the underside of frame 52 toward the exit end thereof is a longitudinally disposed bar 744, and a trip 746 is mounted for slidable movement thereon. This trip has an upper flange plate 748 extending outwardly for engagement with an actuating button 750 on the switch 730. Extending inwardly in the path of the bars on flight 62 is a second flange plate 752. A flexible chain 754 is attached between follower roller 742 and trip member 746 over an idler wheel 756. A spring 758 urges trip member 746 to the right in FIG. 2A toward the exit end of the machine. Plate 748 is of sufficient length to maintain contact with switch-actuating button 750 over the entire range of movement of trip member 746, and flange plate 752 is of sufficient length to maintain contact with the flight bar on flight 62 for a sufficient period to permit switch 728 to subsequently open through the operation of cam disk 728a. It may be seen that as the machine is adjusted for the accommodation of a wider carton by the movement of supporting plate 244 away from the center of the machine, follower 742 will move downwardly in guide 740 permitting follower member 746 to move toward the exit end of the machine on shaft 744 under the influence of spring 758. The wider the carton and the longer the flap, the sooner the switch 730 is actuated by trip member 746.

After the end flaps have been tucked inwardly, and glue has been properly distributed on the side flaps, the side flaps are closed by means of curved folding members 760, 762, 764 and 766, thus completely sealing the carton.

In operation, the carton is moved into contact with stop bar 118 by means of belt conveyor 56. At the proper time in the cycle of the machine as determined by the cam 134, the stop bar 118 is lowered, and the carton is moved by belt conveyor 56 onto rapid feed roll 58. Rapid feed roll 58 increases the speed of the carton and causes the separation between the carton and the remaining cartons in file on the conveyor 56. Stop bar 118 then moves into position behind the carton on rapid feed roll 58. The carton is moved by feed roll 58 onto rolls 138, and the carriages 140 and 142 are moved transversely into engagement with the sides of the carton and effect centering of the carton, the movement of these carriages being timed through switches in electrical camming mechanism 92. When the carton has been centered, the carriages are stopped by means of switches 164 and 168, respectively, actuated by trip arms 161 and 165. The carton is then moved onto taper rolls 178 and 179 which are carried on carriages 140 and 142, respectively. These taper rolls permit the bottom side flaps of the carton to open slightly so that the carton may be moved by flight 60 onto package plate 172.

Flap lifter 182, actuated by the carton and timed into the cycle of the machine by cam 204, is raised to its operative position to support the bottom flaps and the contents of the carton after the carton has started onto package plate 172. As the carton is moved over the taper rolls 178 and 179 onto the package plate 172, width arms 340 and 348 are engaged by the carton, and width bars 336 and 338 are opened. This separation of width bars 336 and 338 continues as the package is advanced by flight 60 until the distance between these bars is sufficient to permit the passage of the carton therebetween. The positioning of bars 336 and 338 positions a cam 378 and a follower 404 to operate a valve 412, which in turn governs the operation of width adjust motor 300. The motor 300 permits the lateral adjustment of the supporting plates on which the various glue-applying and flap-manipulating mechanisms are mounted. The positioning of bars 336 and 338 also causes corresponding vertical adjustment of the photoelectric height-sensing units relative to subframe 246 to compensate for the flap height.

At a proper time in the cycle cam-operated switch 443 is closed, and the photoelectric units are effective to control the height adjustment motor 304. The subframe 248 is vertically positioned by motor 304 until light is received by the photoelectric cell of one of the units, and the light to the photoelectric cell of the other unit is interrupted. The normally closed "no carton" switch 364 is connected in both the height and adjust circuits, and when there is no carton in the machine finger 362 opens this switch so that no adjustments can be made.

When the supporting plates have been properly adjusted for the height and width of the carton, the carton which had been momentarily stopped to permit the adjustments to be completed, is moved forward by flight 62. The front flap of the carton is folded down by means of flap closer 466, and glue is applied by roller assemblies 470, 472, 474 and 476 to the top and bottom outer flaps of the carton. This application of glue continues until the front end of the carton engages the glue skip trip 680 which has been longitudinally positioned in accordance with the carton width, and solenoid 646 moves the backup rolls away from engagement with the side flaps of the carton. When the flight bar on flight 62 engages skip stop trip 692, which has also been positioned in accordance with the carton width, the circuit to solenoid 646 is again opened permitting the four backup rolls to move back into their normal position for the application of glue to the side flaps by the glue rolls.

At approximately the same time that the glue skip operation is taking place, another flight bar on flight 62 comes into engagement with trip member 746 which has also been positioned in accordance with the width of the carton actuating the rear flap tucking mechanism which folds the rear flap downwardly so that it may pass under front flap closer 466. The carton is then moved into engagement with outer flap folding members 762, 764 and 766 which fold glued outer flaps onto the folded inner flaps to completely seal the carton.

Although the invention has been described with a certain degree of particularity. it is understood that the present disclosure has been made only by way of example and that many modifications and changes in various details may be resorted to without departing from the spirit and scope of the invention, as hereinafter claimed.

What is claimed is:

1. In an apparatus for sealing cartons, means for conveying the cartons in a predetermined direction with the top flaps thereof substantially erect, selectively positionable means for manipulating and applying a sealing medium to the flaps of the cartons, first sensing means for determining the width of each carton, means responsive to said first sensing means for laterally positioning said flap-manipulating and sealing medium-applying means, adjustable second sensing means for determining the location of the carton top flap extremity, flap compensating means responsive to said first sensing means to effect adjustment of said second sensing means in accordance with the width of the carton, and means responsive to said second sensing means for vertically positioning said flap-manipulating and glue-applying means.

2. In an apparatus for sealing cartons, conveyor means for conveying the cartons along a linear path with the top flaps substantially erect, selectively positionable means for manipulating and applying a sealing medium to the flaps of the cartons, a pair of width-sensing elements pivotally mounted on opposite sides of said conveyor means for movement toward and away from each other in said linear path, means urging said elements being urged toward each other and adapted to be pivotally moved away from each other by the carton as it moves into engagement therewith and passes therebetween, whereby the pivotal position of each element is determined by the width of the carton, means responsive to the pivotally positioning of said elements for laterally positioning said flap-manipulating and sealing medium-applying means, height-sensing means for determining the height of the carton, and means responsive to said height-sensing means for vertically positioning said flap-manipulating and sealing medium-applying means.

3. In an apparatus for sealing cartons, conveyor means for conveying the cartons along a linear path with the top flaps substantially erect, selectively positionable means for manipulating and applying a sealing medium to the flaps of the cartons, a pair of width-sensing elements pivotally mounted on opposite sides of said conveyor means for movement toward and away from each other in said linear path, said elements being urged toward each other and adapted to be pivotally moved away from each other by the carton as it moves into engagement therewith and passes therebetween, whereby the pivotal position of each element is determined by the width of the carton, means responsive to the pivotal positioning of said elements for laterally positioning said flap-manipulating and sealing medium-applying means, traversing means interconnecting said width-sensing elements, whereby the movement of one of said elements results in corresponding movement of the other of said elements, means for centering and orienting each carton on said conveyor means and for maintaining the orientation of each carton as it is moved into engagement with said width-sensing elements to effect separation thereof, height-sensing means for determining the height of the carbon, and means responsive to said height-sensing means for vertically positioning said flap-manipulating and sealing medium-applying means.

4. In an apparatus for sealing cartons, means for conveying the cartons along a linear path with the top flaps substantially erect, selectively positionable means for manipulating and applying a sealing medium to the flaps of the cartons, a pair of width-sensing elements pivotally mounted on opposite sides of said conveying means for movement inwardly toward and outwardly away from each other in said linear path, means responsive to the pivotal positioning of said elements for effecting lateral adjustment of said flap-manipulating and sealing medium-applying means, height-sensing means urged toward a normal position and vertically adjustable therefrom with respect to said manipulating and sealing medium-applying means and adapted to determine the location of the carton top flap extremity, flap compensating means interconnecting said width-sensing elements and said height-sensing means, the vertical adjustment of said height-sensing means being determined by the pivotal positioning of said elements, and said elements being disposed inwardly toward each other when said height-sensing means is in its normal position, and means responsive to said height-sensing means for vertically positioning said flap-manipulating and glue-applying means.

5. The structure of claim 4 in which traversing means interconnects said width-sensing elements, whereby the movement of one of said elements results in corresponding movement of the other of said elements.

6. In an apparatus of the type described a frame, means on said frame for conveying cartons along a linear path, a subframe assembly mounted on said frame for relative vertical positioning with respect to said conveying means, said subframe assembly having mechanisms thereon for performing related operations on the cartons as the cartons are moved along said linear path, sensing-means mounted on said subframe for determining the height of each carton, and means responsive to said sensing means for effecting relative vertical positioning of said subframe, whereby the related operations may be performed by said mechanisms on cartons of various heights.

7. In an apparatus of the type described a frame, conveyor means on said frame for conveying cartons along a linear path with the top flaps thereof substantially erect, a subframe assembly mounted on said frame for relative vertical positioning with respect to said conveying means, said assembly including a pair of supports mounted for relative lateral movement and positioning and interrelated mechanisms mounted on said supports for performing related operations on cartons of various shapes and sizes according to the vertical positioning of said subframe assembly and the lateral positioning of said supports, a pair of operatively interconnected width-sensing elements mounted on said frame on opposite sides of said conveyor means for movement toward and away from each other in said linear path, means responsive to the movement of said elements for effecting lateral positioning of said supports, height-sensing means vertically adjustable from a normal position with respect to said subfame and adapted to determine the location of the carton top flap extremity, flap compensating means including a flexible sleeve and a flexible shaft movable axially within said sleeve, said sleeve having one end thereof mounted in fixed position with respect to said frame and the opposite end thereof mounted in fixed position with respect to said subframe, said flexible shaft having one end thereof operatively connected to one of said width-sensing elements, and the other end thereof operatively connected to said height-sensing means, whereby the vertical adjustment of said height-sensing means with respect to said subframe is determined by the position of said width-sensing elements with respect to said frame and said width-sensing elements are urged toward each other by said height-sensing means, and means responsive to said height-sensing means for vertically positioning said subframe.

8. In an apparatus of the type described, an elongate frame, means on said frame for conveying cartons along said frame, a pair of supports mounted on said frame for relative lateral movement and positioning with respect to said conveying means, each support having mechanisms thereon for performing related operations on the cartons as the cartons are being moved by said conveying means, a sensing member mounted on said frame for movement transverse to said linear path to determine the width of each carton, a cam element mounted for movement on said frame, a follower element in engagement with said cam element and mounted on said frame for relative movement along a predetermined path with respect to said frame and said cam element, said cam element being shaped to provide movement of said follower portion transverse to said predetermined path, means connecting one of said elements to said sensing member, whereby said one element may be positioned in accordance with the width of the carton, means operatively connecting the other of said elements to one of said supports, whereby said other element may be positioned in accordance with the positioning of said one support, and means responsive to the transverse movement of said follower element portion for effecting relative lateral positioning of said supports.

9. The structure of claim 8 wherein said cam element is shaped to provide transverse movement of said follower element between two operating positions and a neutral position, said support positioning means being effective to move said supports toward each other when said follower element is in one of said operating positions and away from each other when said follower element is in the other of said operating positions.

10. In an apparatus of the type described, a frame, means on said frame for conveying cartons along a linear path, a pair of supports mounted on said frame for relative lateral movement and positioning with respect to said conveying means, each support having mechanisms thereon for performing related operations on the cartons as the cartons are moved along said linear path, a sensing member mounted on said frame for movement transverse to said linear path to determine the width of each carton, a cam element mounted for rotative movement on said frame, a follower element coaxially rotatable with respect to said cam element and having a portion thereof in engagement with said cam element and movable radially with respect to the axis of rotation thereof, said cam element being shaped to provide two extreme radial positions and an intermediate position for said follower element portion as said elements are moved relative to each other, means connecting one of said elements to said sensing member, whereby said one element may be rotatably moved and positioned in accordance with the movement and positioning of said sensing member, means connecting the other of said elements to one of said supports, whereby said other element may be rotatably moved and positioned in accordance with the movement and positioning of said one support, and means responsive to the radial movement of said follower element portion to effect movement of said supports toward each other when said follower element portion is in one extreme position and to effect movement of said supports away from each other when said follower element portion is in the other extreme position.

11. In an apparatus for sealing cartons, a frame, means for conveying the cartons along a predetermined route, a first pair of supports mounted on said frame for relative lateral adjustment, a subframe mounted on said frame for relative vertical adjustment with respect to said first pair of supports, a second pair of supports mounted on said subframe for relative lateral adjustment, interrelated mechanisms mounted on said supports for performing related operations on cartons of various shapes and sizes according to said adjustments, two substantially parallel racks, one rack being fixed to said frame above said subframe and the other rack being fixed to said frame below said first pair of supports, a first shaft extending through and rotatably movable with respect to one of said first pair of supports and one of said second pair of supports, a second shaft extending through and rotatably movable with respect to the other of said first pair of supports and the other of said second pair of supports, said shafts having pinion portions adjacent their extremities in engagement with said racks, and means for moving said shafts laterally to effect simultaneous corresponding lateral adjustment of said pairs of supports.

12. In an apparatus for sealing cartons, a frame, means for conveying the cartons along a predetermined route, a first pair of supports mounted on said frame for relative lateral adjustment, a subframe mounted on said frame for relative vertical adjustment with respect to said first pair of supports, a second pair of supports mounted on said subframe for relative lateral adjustment, interrelated mechanisms mounted on said supports for performing related operations on cartons of various shapes and sizes according to said adjustments, two substantially parallel racks, one rack being fixed to said frame above said subframe and the other rack being fixed to said frame below said first pair of supports, a first shaft extending through and rotatably movable with respect to one of said first pair of supports and one of said second pair of supports, a second shaft extending through and rotatably movable with respect to the other of said first pair of supports and the other of said second pair of supports, said shafts having pinion portions adjacent their extremities in engagement with said racks, whereby lateral movement of said shafts will result in simultaneous corresponding lateral movement of said pairs of supports, first sensing means for determining the width of each carton, means responsive to said first sensing means for effecting lateral movement of said shafts and lateral adjustment of said pairs of supports, second sensing means for determining the height of each carton, and means responsive to said second sensing means for effecting vertical adjustment of said subframe.

13. In an apparatus for sealing cartons, a frame, means for conveying the cartons along a predetermined route, a first pair of supports mounted on said frame for relative lateral adjustment, a subframe mounted on said frame for relative vertical adjustment with respect to said first pair of supports, a second pair of supports mounted on said subframe for relative lateral adjustment, interrelated mechanisms mounted on said supports for performing related operations on cartons of various shapes and sizes according to said adjustments, a first shaft extending between and interconnecting one of said first pair of supports and one of said second pair of supports, a second shaft extending between and interconnecting the other of said first pair of supports and the other of said second pair of supports, a plurality of vertical racks connected to said subframe, a pinion in engagement with each of said racks and power means for effecting rotative movement of said pinions, whereby said subframe may be vertically adjusted, and means for moving said shafts laterally to effect simultaneous corresponding lateral adjustment of said pairs of supports.

14. In an apparatus of the type described, a frame, means on said frame for conveying cartons with the top flaps thereof substantially erect, a subframe assembly mounted on said frame for relative vertical positioning with respect to said conveying means, said subframe assembly including a pair of supports mounted for relative lateral positioning and mechanisms on said supports for performing related operations on the cartons as the cartons are moved by said conveying means, height-sensing means vertically adjustable with respect to said subframe and adapted to determine the location of the carton top flap vertical extremity, width-sensing means for determining the width of each carton, flap compensating means responsive to said width-sensing means for effecting adjustment of said height-sensing means in accordance with the width of said carton, means responsive to said width-sensing means for effecting lateral positioning of said supports, and means responsive to said height-sensing means for vertically positioning said subframe.

15. In an apparatus of the type described, a frame, means on said frame for conveying cartons along a linear path, a subframe assembly mounted on said frame for relative vertical positioning with respect to said conveying means, said subframe assembly having mechanisms thereon for performing related operations on the cartons as the cartons are moved along said linear path, a pair of vertically spaced photoelectric units operatively mounted on said subframe, each unit having two parts comprising a light source and a photosensitive means, vertical positioning means responsive to a signal from the photosensitive means of one of said units to effect vertical positioning of said subframe in one direction and responsive to a signal from the photosensitive means of the other of said units to effect vertical positioning of said subframe in the opposite direction, the photosensitive means of said one unit being effective to operatively energize said vertical positioning means only upon receipt of light from its light source, and the photosensitive means of said other unit being effective to operatively energize said vertical positioning means only upon the interruption of light from its light source.

16. In an apparatus of the type described, a frame, means on said frame for conveying cartons along a linear path, a subframe assembly mounted on said frame for relative vertical positioning with respect to said conveying means, said subframe assembly having mechanisms thereon for performing related operations on the cartons as the cartons are moved along said linear path, a pair of vertically spaced photoelectric units operatively mounted on said subframe, one of said photoelectric units being disposed slightly below the other of said units, each unit having two parts comprising a light source and a photosensitive means, vertical positioning means responsive to a signal from the photosensitive means of said one unit to effect vertical positioning of said subframe in one direction and responsive to a signal from the photosensitive means of said other unit to effect vertical positioning of said subframe in the opposite direction, the photosensitive means of said one unit being effective to operatively energize said vertical positioning means only upon receipt of light from its light source, and the photosensitive means of said other unit being effective to operatively energize said vertical positioning means only upon the interruption of light from its light source.

17. In an apparatus of the type described, a frame, conveyor means on said frame for conveying cartons with the top flaps thereof substantially erect, a subframe assembly mounted on said frame for relative positioning with respect to said conveying means along a predetermined axis, said subframe assembly including a pair of supports mounted for relative positioning transverse to said predetermined axis and mechanisms on said supports for performing related operations on the cartons as the cartons are moved by said conveyor means, a pair of elongate interconnected arms adjustably mounted in spaced relationship on said subframe, photoelectric means mounted on said arms and effective to determine the location of the carton top flap extremity, width-sensing means mounted on said frame for determining the width of each carton, flap compensating means responsive to said width-sensing means to effect adjustment of said arms and said photoelectric means in accordance with the width of the carton, means responsive to said width-sensing means for effecting transverse positioning of said supports, and means responsive to said photoelectric means for positioning said subframe along said predetermined axis.

18. In an apparatus of the type described, a frame, means on said frame for conveying cartons with the top flaps thereof substantially erect, a subframe assembly mounted on said frame for relative vertical positioning with respect to said conveying means, said subframe assembly including a pair of supports mounted for relative lateral positioning and mechanisms on said supports for performing related operations on the cartons as the cartons are moved by said conveying means, a pair of vertically spaced photoelectric units, each unit having two parts comprising a light source and a photosensitive means, a pair of mounts, a part of each photoelectric unit being attached to one of said mounts and the remaining part of each unit being attached to the other of said mounts, two pairs of spaced, parallel radius bars, one pair of bars pivotally connected to said one mount and the other pair of bars pivotally connected to said other mount, one pair of bars being pivotally connected to said subframe adjacent one side thereof and the other pair of bars being connected to said subframe adjacent the opposite side thereof, means interconnecting said pairs of radius bars, whereby said mounts may be adjustably moved in unison with respect to said subframe and the photoelectric unit parts attached thereto are maintained in a predetermined vertical orientation, width-sensing means for determining the width of each carton, flap compensating means responsive to said width-sensing means for effecting adjustment of said pair of mounts and said photoelectric units with respect to said subframe, means responsive to said width-sensing means for effecting lateral positioning of said supports, and means responsive to said photoelectric units for effecting vertical positioning of said subframe.

19. In an apparatus of the type described, an elongate frame, conveyor means for receiving cartons and for conveying the cartons in a predetermined direction and sequence, vertically and horizontally adjustable interrelated mechanism means for performing related operations on the cartons, carton support means for supporting the carton with the bottom side flaps open as the related operations are performed thereon, two carriage members mounted on said frame for lateral movement toward and away from each other, carriage moving means for effecting movement of said carriage members toward each other when a carton is therebetween, said carriage members having control switch means thereon for de-energizing said carriage moving means to stop the inward movement of said carriage members when both of said members have engaged the carton, whereby the carton may be centered on said conveyor means and said carriage members may be spaced in accordance with the width of the carton, preliminary flap-opening means carried on said carriage members for supporting the bottom side flaps of the carton at an oblique angle with respect to the horizontal, whereby when the carton is moved thereon the bottom side flaps will be permitted to open slightly, flap-lifting means intermediate said carton support means and said preliminary flap-opening means for supporting the lower side flaps and the contents of the carton as the carton is moved onto said carton support means, first sensing means for determining the width of each carton, means responsive to said first sensing means for effecting horizontal adjustment of said interrelated mechanism means, second sensing means for determining the height of each carton, and means responsive to said second sensing means for effecting vertical adjustment of said interrelated mechanism means.

20. In an apparatus of the type described, an elongate frame, conveyor means for receiving cartons and for conveying the cartons in a predetermined direction and sequence, vertically and horizontally adjustable interrelated mechanism means for performing related operations on the cartons, carton support means for supporting the carton with the bottom side flaps open as the related operations are performed thereon, two carriage members mounted on said frame for lateral movement toward and away from each other, carriage moving means for effecting movement of said carriage members toward each other when a carton is therebetween, said carriage members having control switch means thereon for de-energizing said carriage moving means to stop the inward movement of said carriage members when both of said members have engaged the carton, whereby the carton may be centered on said conveyor means and said carriage members may be spaced in accordance with the width of the carton, a plurality of independently rotatable angular rollers mounted on each of said carriage members, each roller presenting an oblique angular supporting surface to the bottom side flaps of the carton, whereby when the carton is moved thereon the bottom side flaps will be permitted to open slightly, flap-lifting means intermediate said carton support means and said angular rollers for supporting the lower side flaps and the contents of the carton as the carton is moved onto said carton support means, first sensing means for determining the width of each carton, means responsive to said first sensing means for effecting horizontal adjustment of said interrelated mechanism means, second sensing means for determining the height of each carton, and means responsive to said second sensing means for effecting vertical adjustment of said interrelated mechanism means.

21. In an apparatus of the type described, conveyor means for receiving cartons and for conveying the cartons in a predetermined direction and sequence, means for centering each carton on said conveyor means, interrelated mechanism means for performing related operations on the carton, carton support means for supporting the carton with the bottom side flaps open as related operations are performed thereon, preliminary flap-opening means for opening the bottom side flaps of the carton sufficiently to permit the carton to be moved onto said carton support means without dropping the contents of the carton, a lower flap-lifting member mounted on said frame for movement between an extended position and a retracted position, means resiliently urging said member toward its extended position, retracting means synchronized with said conveying means for moving said member into its retracted position at a predetermined time in cycle, latch means for holding said member in its retracted position until a carton is moved into proper position, said latch means being adapted upon contact by a carton moved into said proper position to release said member, whereby said member may be moved into its extended position by said resilient means to support the lower flaps and contents of said carton as the carton is moved onto said carton support means.

22. In an adjustable apparatus for sealing cartons, conveyor means, means for applying glue to the side flaps of a carton as the carton is being moved by said conveyor means, first trip means relatively positionable with respect to said glue-applying means along said conveyor means in accordance with the width adjustment of said apparatus to signal the passage thereby of the leading end of the carton, second trip means relatively positionable with respect to said glue-applying means along said conveyor means in accordance with the width adjustment of said apparatus to signal the passage thereby of the trailing end of the carton, said glue-applying means being responsive to said first trip means to interrupt the application of glue to the side flaps of the carton and responsive to said second trip means to stop the interruption of the application of glue to the side flaps of the carton.

23. The structure recited in claim 22 wherein said first and second trip means are each positioned from the glue-applying means a distance approximately equal to half the width of the carton.

24. In a carton sealing apparatus of the type described, a plurality of apertured supports mounted on said frame for relative adjustment in accordance with the size of the carton, a driven member on each of said supports, means on said supports for effecting rotation of said driven members, a plurality of glue roll assemblies, each assembly being adapted to be releasably connected to a corresponding support and comprising a glue roll having a shaft extending axially therefrom, means for distributing glue on the surface of said roll and for conducting the excess glue therefrom, a plurality of pins disposed parallel to said glue roll shaft and to each other, and means on opposite sides of said driven member for releasably clamping said glue roll assembly in position on said support with the pins of said assembly in their respective holes in said support and with said glue roll shaft operatively connected to said driven member.

25. In an apparatus for sealing cartons, a frame, conveyor means on said frame for moving cartons along said frame and a plurality of glue roll mechanisms on said frame for applying glue to the side flaps of the cartons as the cartons are being moved by said conveyor; each of said mechanisms including a housing; a glue roll having an axial shaft journalled in said housing, power means for effecting rotation of said shaft, a first wheel mounted on said shaft within said housing, a second wheel mounted for rotation within said housing adjacent said first wheel, the peripheries of said wheels being in close proximity with each other and with the interior of said housing, means operatively interconnecting said wheels whereby rotation of one wheel will result in corresponding rotation of the other wheel, a conduit in communication with the interior of said housing on one side of said wheels, said housing being apertured on the side of said wheels, means for distributing glue over the surface of said roll and for conducting the excess glue into the aperture in said housing, whereby the excess glue may be pumped by the rotation of said wheels into said conduit.

26. In an adjustable apparatus of the type described, including an elongate frame, conveyor means having flights thereon for receiving cartons and for conveying the cartons along said frame with the top flaps thereof substantially erect, a subframe mounted on said frame above said conveyor means for adjustment toward and away from said conveyor means in accordance with the carton height, a pair of supports mounted on said subframe for relative lateral adjustment in accordance with the carton width, a front flap-closing means mounted on said subframe for closing the front flap of the carton as the carton is moved into engagement therewith, and an arm mounted on said subframe for movement into engagement with the rear flap of the carton to effect closing thereof; an improved mechanism for effecting movement of said arm in synchonization with the movement of the carton and in accordance with the width of the carton, said mechanism comprising a track mounted on one of said supports and angularly disposed with respect to the direction of lateral adjustment thereof, a follower mounted on said frame for reciprocal movement transverse to the direction of lateral adjustment of said supports and angularly with respect to said track, said follower having a portion thereof disposed within said track, whereby the transverse positioning of said follower will be determined by the lateral adjustment of said supports, a guide mounted on said frame substantially parallel to said conveyor means, trip means movable along said guide and having a portion extending into the path of the conveyor flights, whereby said trip means may be actuated by the passage thereby of the conveyor flights, means operatively connecting said follower to said trip means, whereby the positioning of said trip means along said guide will be determined by the lateral adjustment of said supports, and means responsive to said trip means for effecting movement of said arm into engagement with the carton rear flap.

27. In an apparatus for sealing cartons, an elongate frame, conveyor means for moving cartons longitudinally along said frame, a first pair of supports mounted on said frame for relative lateral movement toward and away from each other, a second pair of supports mounted on said frame for relative lateral movement toward and away from each other and for relative movement as a unit toward and away from said first pair of supports, means interconnecting said first and second pair of supports whereby the relative lateral movement of the supports in each pair will be identical, each of said supports having means thereon for applying glue to one of the carton side flaps, a movable rack mounted on one of said first pair of supports for movement parallel to said conveyor toward and away from said glue-applying means, first trip means carried by said movable rack to signal the passage thereby of the leading end of the carton, a fixed rack mounted transversely on said frame, a shaft journalled in said one support and having a first pinion portion in engagement with said fixed rack and a second pinion portion in engagement with said movable rack, whereby relative lateral movement of said first pair of supports will result in rotation of said shaft and in positioning of said movable rack and said trip means with respect to said glue-applying means, and second trip means from said first trip means and positionable with respect to said glue-applying means in accordance with the relative position of adjustment of said first pair of supports to signal the passage thereby of the trailing end of the carton, said glue-applying means being responsive to said first trip means to interrupt the application of glue to the side flaps of the carton and responsive to said second trip means to stop the interruption of the application of glue to the side flaps of the carton.

28. In an apparatus for sealing cartons, an elongate frame, conveyor means having at least one flight thereon for moving a carton longitudinally along said frame, a first pair of supports mounted on said frame for relative lateral movement toward and away from each other, a second pair of supports mounted on said frame for relative lateral movement toward and away from each other and for relative movement as a unit toward and away from said first pair of supports, means interconnecting said first and second pair of supports whereby the relative lateral movement of the supports in each pair will be identical, each of said supports having means thereon for applying glue to one of the carton side flaps, a first trip means positionable with respect to said glue-applying means along said conveyor means in accordance with the relative adjustment of said first pair of supports to signal the passage thereby of one end of the carton, a control for said glue-applying means mounted on said frame, a guide mounted horizontally on said frame, a trip mounted on said guide for movement relative thereto, means operatively connecting said trip to one of the supports in said first pair, whereby said trip may be positioned on said guide in accordance with the relative positioning of said first pair of supports, said trip having two oppositely disposed elongate longitudinally extending portions, one of said portions being disposed in the path of the flight on said conveyor means and the other of said portions being in engagement with and adapted to actuate said control, whereby when said trip is engaged by the flight on said conveyor means said control is actuated, said glue-applying means being responsive to said first trip means to interrupt the application of glue to the side flaps of the carton and responsive to said control to stop the interruption of the application of glue to the side flaps of the carton.

29. In an apparatus for sealing cartons of varying height and width dimensions, conveyor means, selectively and biaxially adjustable means for manipulating and applying a sealing medium to the flaps of the cartons, dimension sensing means for determining one of the dimensions of each carton, means responsive to said first sensing means for adjusting said flap-manipulating and sealing medium-applying means along one of the axes in accordance with the one carton dimension, light source means and photosensitive means movable as a unit relative to said conveyor means for determining the other dimension of each carton, and means responsive to said photosensitive means for adjusting said flap-manipulating and sealing medium-applying means along the other of the axes in accordance with the other carton dimension.

30. In an apparatus for sealing cartons, means for conveying the cartons along a linear path with the top flaps substantially erect, selectively positionable means for manipulating and applying a sealing medium to the flaps of the cartons, a width sensing element mounted for movement transverse to said linear path from adjacent one side of said conveying means toward the opposite side thereof into approximately the plane of the nearest side of the carton, means responsive to the movement of said element for effecting lateral adjustment of said flap-manipulating and sealing medium-applying means, height sensing means vertically adjustable with respect to said manipulating and sealing medium-applying means and adapted to determine the location of the carton top flap extremity, flap compensating means interconnecting said width sensing element and said height sensing means, the vertical adjustment of said height sensing means being determined by the transverse positioning of said element, and means responsive to said height sensing means for vertically positioning said flap-manipulating and glue-applying means.

31. In an apparatus for sealing cartons, means for conveying the cartons along a linear path with the top flaps substantially erect, selectively positionable means for manipulating and applying a sealing medium to the flaps of the cartons, a pair of width-sensing elements movable laterally toward and away from each other and adapted to engage the carton to determine the width thereof, means responsive to the movement of said elements for laterally positioning said flap-manipulating and sealing medium-applying means in accordance with the width of the carton, adjustable height sensing means for determining the location of the carton top flap extremity, means for effecting adjustment of said height sensing means in accordance with the height of the carton flaps, and means responsive to said height sensing means for vertically positioning said flap-manipulating and sealing medium-applying means, whereby the vertical positioning of said flap-manipulating and sealing medium-applying means is in accordance with the actual height of the carton.

32. In an adjustable apparatus for sealing cartons, conveyor means, selectively positionable means for manipulating and applying a sealing medium to the side flaps of the cartons, sensing means for determining the width and height of each carton as it passes through said apparatus, power-actuated means responsive to said sensing means for selectively positioning said flap-manipulating and sealing medium-applying means, first control means responsive to the presence of the carton and to the width adjustment for interrupting the application of the sealing medium to the side flaps of the carton for a period of time proportional to the difference between the length and the width of the carton, means for closing the carton rear flap, and control means for said rear flap closing means and responsive to the width adjustment, whereby the closing of the carton rear flap will be timed in accordance with the width of the carton.

33. In an apparatus of the type described, an elongate frame, first conveyor means for receiving cartons and for conveying the cartons through said apparatus, means for positively driving said first conveyor means, second conveyor means in advance of said first conveyor means for moving the cartons toward said first conveyor means, means for positively driving said second conveyor means, stop means intermediate said first and second conveyor means operative to permit the passage of one carton at a time onto said first conveyor means, intermediate conveyor means between said stop means and said first conveyor means for accelerating the movement of the carton from said second conveyor means to said first conveyor means, and means for positively driving said intermediate conveyor means at a carton conveying speed greater than that of said second conveying means to cause said accelerated movement of the carton whereby said stop means may move into the gap between the accelerated carton and the remaining cartons on said second conveyor means to thereby prevent the further advancing on the cartons on said second conveyor means.

34. In an apparatus for sealing cartons, an elongate frame, vertically and horizontally adjustable mechanism means on said frame for applying glue to and subsequently folding closed the side flaps of the carton, carton support means for supporting the carton with the bottom side flaps open as glue is applied thereto, first and second conveyors, said first conveyor being adapted to move an individual carton longitudinally along said frame into a position on said carton support means for subsequent movement by said second conveyor, said second conveyor being synchronized with said first conveyor and effective to move the carton from said position after said carton has been at rest in said position for a predetermined interval, means synchronized with said first conveyor for delivering an individual carton from a file into position for movement by said first conveyor at a predetermined time in cycle, preliminary flap-opening means for opening the bottom side flaps of the carton sufficiently to permit the carton to be moved onto said carton support means without dropping the contents of the carton, flap-lifting means adjacent said carton support means for lifting the lower side flaps as the carton is moved onto said carton support means, first sensing means for determining the width of each carton, means responsive to said first sensing means for effecting horizontal adjustment of said mechanism means, second sensing means for determining the height of each carton, means responsive to said second sensing means for effecting vertical adjustment of said mechanism means, means for folding the top end flaps of the carton closed as the carton is moved by said second conveyor into position for the application of glue to the side flaps thereof, means operatively associated with said mechanism means for effecting interruption of the application of glue to the central portions of the side flaps of the carton in relation to the length and width of the carton.

References Cited in the file of this patent

UNITED STATES PATENTS

| | | |
|---|---|---|
| 2,324,401 | Kimball | July 13, 1943 |
| 2,366,888 | Werden et al. | Jan. 9, 1945 |
| 2,550,928 | Kay | May 1, 1951 |
| 2,764,123 | Derderian | Sept. 25, 1956 |
| 2,866,535 | Verrinder et al. | Dec. 30, 1958 |
| 2,919,527 | Smith | Jan. 5, 1960 |
| 2,986,262 | Powers | May 30, 1961 |